US012455080B2

(12) United States Patent
Weilert et al.

(10) Patent No.: US 12,455,080 B2
(45) Date of Patent: Oct. 28, 2025

(54) COMBUSTION OVEN

(71) Applicant: Solo Brands, LLC, Grapevine, TX (US)

(72) Inventors: Jeffrey R. Weilert, Southlake, TX (US); Alexander K. Maghsadi, Fort Worth, TX (US)

(73) Assignee: Solo Brands, LLC, Grapevine, TX (US)

( * ) Notice: Subject to any disclaimer, the term of this patent is extended or adjusted under 35 U.S.C. 154(b) by 0 days.

(21) Appl. No.: 18/651,550

(22) Filed: Apr. 30, 2024

(65) Prior Publication Data
US 2024/0280268 A1 Aug. 22, 2024

Related U.S. Application Data

(63) Continuation of application No. 17/490,442, filed on Sep. 30, 2021, now Pat. No. 12,078,359.

(51) Int. Cl.
*F24C 1/16* (2021.01)
*F24B 1/22* (2006.01)
*F24B 13/00* (2006.01)
*F24B 13/02* (2006.01)
*F24C 1/04* (2021.01)
*F24C 1/06* (2021.01)
*F24C 3/08* (2006.01)

(52) U.S. Cl.
CPC .................. *F24C 1/16* (2013.01); *F24B 1/22* (2013.01); *F24B 13/008* (2013.01); *F24B 13/02* (2013.01); *F24C 1/04* (2013.01); *F24C 1/06* (2013.01); *F24C 3/087* (2013.01)

(58) Field of Classification Search
CPC .... F24C 1/16; F24C 1/04; F24C 3/087; F24B 1/22
See application file for complete search history.

(56) References Cited

U.S. PATENT DOCUMENTS

| 1,541,692 A |   | 6/1925 | Elison |   |
|---|---|---|---|---|
| 2,102,893 A | * | 12/1937 | Forster | F24C 1/16 126/214 C |
| 3,851,639 A |   | 12/1974 | Beddoe |   |
| 4,307,659 A | * | 12/1981 | Martin | A47J 37/06 99/446 |

(Continued)

FOREIGN PATENT DOCUMENTS

| FR | 2748384 A1 | 11/1997 |
| KR | 102300245 B1 | 9/2021 |
| WO | 2021165200 A1 | 8/2021 |

OTHER PUBLICATIONS

Korean Intellectual Propoerty Office, International Search Report and Written Opinion of the International Searching Authority for PCT/US2022/044503, Jan. 11, 2023, 10 pages.

(Continued)

*Primary Examiner* — David J Laux
(74) *Attorney, Agent, or Firm* — Haynes and Boone, LLP

(57) ABSTRACT

An oven is provided, which includes a domed ceiling, a baking stone located below the domed ceiling, a cooking chamber between the domed ceiling and the baking stone, a front opening that provides access to the cooking chamber for food and utensils, a combustion chamber adjacent to, and at least partially below, the cooking chamber, and a rear opening that provides access to the combustion chamber.

18 Claims, 17 Drawing Sheets

(56) References Cited

U.S. PATENT DOCUMENTS

| | | | |
|---|---|---|---|
| D286,128 S | 10/1986 | Bowen et al. | |
| 4,616,562 A * | 10/1986 | Kuechler | F24C 15/2042 |
| | | | 126/299 R |
| 5,492,055 A | 2/1996 | Nevin et al. | |
| 5,605,092 A * | 2/1997 | Riccio | F24C 1/04 |
| | | | 99/447 |
| 6,314,955 B1 * | 11/2001 | Boetcker | A47J 37/0763 |
| | | | 126/38 |
| 7,686,010 B2 | 3/2010 | Gustavsen | |
| 8,578,928 B2 | 11/2013 | Gustavsen | |
| 9,182,129 B2 | 11/2015 | Dahle et al. | |
| 9,420,800 B1 * | 8/2016 | Froelicher | A21B 1/24 |
| 9,848,731 B2 | 12/2017 | Dahle et al. | |
| 9,995,492 B2 | 6/2018 | Froelicher et al. | |
| 10,012,392 B2 | 7/2018 | Froelicher et al. | |
| 10,413,123 B2 | 9/2019 | Dahle et al. | |
| 10,477,867 B2 | 11/2019 | Froelicher et al. | |
| D873,063 S | 1/2020 | Zeng et al. | |
| 10,598,384 B2 * | 3/2020 | Cuffaro | A47J 37/0763 |
| 10,788,266 B2 | 9/2020 | Tseng et al. | |
| 10,823,426 B2 | 11/2020 | Tseng et al. | |
| 10,828,425 B2 | 11/2020 | Tseng et al. | |
| 10,912,307 B2 | 2/2021 | Moretti | |
| 10,920,988 B2 | 2/2021 | Tseng et al. | |
| 10,920,989 B2 | 2/2021 | Tseng et al. | |
| 10,941,945 B2 * | 3/2021 | Tapaninaho | A47J 37/0704 |
| 11,206,947 B1 | 12/2021 | Barnhart et al. | |
| D976,631 S | 1/2023 | Gozney | |
| 12,078,359 B2 * | 9/2024 | Weilert | F24C 1/04 |
| 2008/0163764 A1 | 7/2008 | Payen et al. | |
| 2009/0178579 A1 * | 7/2009 | Heiser | F24C 15/021 |
| | | | 99/421 H |
| 2013/0276643 A1 | 10/2013 | Krolick et al. | |
| 2014/0021191 A1 * | 1/2014 | Moon | A23B 2/90 |
| | | | 34/220 |
| 2014/0026881 A1 * | 1/2014 | Abrams | A47J 37/0658 |
| | | | 126/25 R |
| 2014/0196609 A1 | 7/2014 | Snyman | |
| 2014/0216434 A1 * | 8/2014 | Moreth, III | A21B 2/00 |
| | | | 126/92 AC |
| 2015/0338104 A1 | 11/2015 | Lipinski | |
| 2016/0095472 A1 * | 4/2016 | Dahle | A21D 8/06 |
| | | | 99/447 |
| 2018/0020681 A1 * | 1/2018 | Froelicher | A21B 1/26 |
| | | | 219/392 |
| 2018/0116453 A1 | 5/2018 | Boyd et al. | |
| 2018/0213973 A1 * | 8/2018 | Tapaninaho | F24C 15/002 |
| 2018/0228169 A1 | 8/2018 | Froelicher et al. | |
| 2019/0099039 A1 | 4/2019 | Li et al. | |
| 2019/0099041 A1 | 4/2019 | Figueroa et al. | |
| 2019/0195506 A1 | 6/2019 | Tseng et al. | |
| 2019/0293296 A1 * | 9/2019 | Measom | A47J 37/0786 |
| 2020/0015626 A1 * | 1/2020 | Corso | A47J 37/0704 |
| 2020/0015628 A1 | 1/2020 | Corso et al. | |
| 2020/0054168 A1 | 2/2020 | Anderson | |
| 2020/0077839 A1 | 3/2020 | Dahle et al. | |
| 2020/0345176 A1 | 11/2020 | Bert | |
| 2021/0018180 A1 | 1/2021 | Jan et al. | |
| 2021/0076874 A1 | 3/2021 | Tapaninaho | |
| 2021/0088219 A1 * | 3/2021 | Remington | F24C 1/06 |
| 2021/0161151 A1 | 6/2021 | Thorogood et al. | |
| 2021/0259467 A1 * | 8/2021 | Pruitt | A47J 37/0658 |

OTHER PUBLICATIONS

European Patent Office, Partial Supplemental European Search Report, Application No. 22877174.7-1005, Aug. 7, 2025, 13 pages, The Hague.

IP Australia, Examination Report No. 1, AU Application No. 2022357221, Jun. 30, 2025, 4 pages.

* cited by examiner

COMBUSTION OVEN

CROSS-REFERENCE TO RELATED APPLICATION AND PRIORITY

This application is related to U.S. application Ser. No. 29/809,967, filed Sep. 30, 2021 the entire disclosure of which is hereby incorporated by reference as though fully set forth herein.

This application is a continuation of U.S. application Ser. No. 17/490,442, filed Sep. 30, 2021, the entire disclosure of which is hereby incorporated by reference as though fully set forth herein.

TECHNICAL FIELD

The subject matter described herein relates to a combustible fuel burning oven with modular components. This oven has particular but not exclusive utility for outdoor cooking.

BACKGROUND

Portable, fixed, and semi-fixed ovens are used for example in camping, in residential back yards, or other locations to cook pizza and other foods. The dimensions and construction of ovens may make them difficult to move or store. External surfaces of an oven may be dangerously hot while the oven is operating, or shortly thereafter, thus limiting the types of surfaces on which the oven can be placed, limiting the ability of users to move the oven, etc. Oven materials may be subject to significant heat and weathering and may therefore experience oxidation or warpage that limit their service life, affect their aesthetic appearance, and may in some circumstances cause structural failure with additional attendant fire risk. Utensils, doors, handles, and other components can become coated with grease and other materials during use or may become dangerously hot. Utensils, doors, handles, and other components that touch the ground or other surfaces may become contaminated or may present a risk of fire or risk of burn injury. When the oven's cooking surface (e.g., a pizza baking stone) is heated to cooking temperatures, users may find it difficult to access the fuel (e.g., to add or rearrange fuel materials) without risk of fire or injury.

Many existing oven designs do not permit adequate air flow required to support full and even combustion of the fuel, thus resulting in smoke that can affect nearby people and animals and can affect food quality. Improper use of an oven may result in improperly cooked food and/or the risk of fire or injury. Emptying ashes and un-combusted fuel from an oven may be labor-intensive or messy.

It should therefore be appreciated that commonly used ovens have numerous drawbacks, including one or more of low portability, poor combustion performance, poor cooking performance, short service life, smoke generation, fire risk, safety risk, contamination risk, and aesthetic degradation, among others. Accordingly, long-felt needs exist for ovens that address one or more of the forgoing or other concerns.

The information included in this Background section of the specification, including any references cited herein and any description or discussion thereof, is included for technical reference purposes only and is not to be regarded as subject matter by which the scope of the disclosure is to be bound.

SUMMARY

This disclosure is directed to a modular cooking apparatus, disclosed herein as an oven. The modular oven may include combinations of advantageous features, such as stainless-steel construction, a circulation-enhancing front doorway top lip, a dome-shaped cooking chamber, fully removable front and rear doors, a dual-fuel design, front and rear air intakes, integral handgrips, rubberized feet, and a flat, rubberized top surface. The modular oven is designed to enhance convective circulation in the interior, providing enhanced efficiency and temperature stability, to cook more evenly for longer periods of time. A double-walled oven body may be insulated with ceramic type high-heat insulation to help with heat retention.

In typical oven designs, combustion make up air is drawn in through the doorway. The example modular oven disclosed herein uses vents in the base to bring air into the housing from below, and then circulate up through the combustion chamber. This also may bring fresh air into the combustion chamber at different heights, which in some implementations, may permit integration of secondary combustion features. Some implementations may employ one or more internal heat baffles underneath the stone and ash pan help reflect radiant heat back up into the cooking chamber. Removable handles on the doors allow for quick engagement but smaller storage profile. In some aspects, an internal, two-piece baking stone covers the entire width of the interior of the oven, to provide a larger thermal mass to help offset temperature drops from door openings and closings and may provide consistent heating when used without doors. The ash pan and ash pan grate may be removable. In certain implementations, spacing and air inlet holes are strategically located to allow efficient burning and allow secondary combustion. In some aspects, a gas burner can install in the same rear door location by removing the rear door.

The modular oven disclosed herein has particular, but not exclusive, utility for outdoor cooking. For example, cooking may be done in yards, parks, campsites, or other areas.

Some general aspects of the modular oven include a domed ceiling; a baking stone disposed below the domed ceiling; a cooking chamber between the domed ceiling and the baking stone; a first opening that provides access to the cooking chamber, the first opening sized to accommodate food to be cooked in the oven. The oven also includes a combustion chamber disposed adjacent the cooking chamber and at least partially below the cooking chamber; and a second opening that provides access to the combustion chamber.

Implementations may include one or more of the following features. Some embodiments include a first nesting feature in the combustion chamber; an ash pan including a second nesting feature and removably positionable within the first nesting feature; and a fuel basket removably positionable within the second nesting feature and within the combustion chamber, where the ash pan and fuel basket are sized to pass through the second opening. In some embodiments, the ash pan and the fuel basket each include a plurality of ventilation holes, the fuel basket being in fluid communication with at least one air intake. In some embodiments, The plurality of ventilation holes in the fuel basket include holes at a lower elevation and holes at a higher elevation, the holes at a higher elevation being disposed to provide secondary combustion of gases released from a combusting fuel in the fuel basket. In some embodiments, the oven further includes a front opening bezel positioned within the first opening; and a front door removably positionable within the front opening bezel. In some embodiments, the oven further includes a front lip positioned at a top edge of the front opening bezel, the front lip configured to affect air flow within the cooking chamber. In some embodiments, a height of the front opening has a ratio of between 1:1:47 and 1:1.61. to a height of a highest feature of the domed ceiling above the baking stone. In some embodiments, the combustion chamber is configured to interchangeably accommodate both a fuel burning basket and a gas burner. In some embodiments, the combustion chamber configured to simultaneously accommodate both a fuel burning basket and a gas burner. In some embodiments, the oven further includes a rear opening bezel positioned within the second opening. In some embodiments, the oven further includes a gas burner removably positionable within the rear opening bezel and configured to supply heat to the cooking chamber when a gas of the gas burner is combusted. In some embodiments, the oven further includes a heat shield disposed behind the baking stone and extending to an elevation above the baking stone, the heat shield separating the cooking chamber from the combustion chamber.

One general aspect includes an oven with an oven body including: an outer wall; an inner wall disposed within and spaced from the outer wall; a top portion including a flat upper surface; a bottom portion including a bottom surface, the bottom portion including at least one formed handgrip and at least one air intake; a domed ceiling attached to the inner wall below the flat upper surface; a baking stone positioned below and spaced from the domed ceiling; a cooking chamber defined by the baking stone, the domed ceiling, and the inner wall; a combustion chamber adjacent the cooking chamber; a baffle positioned between and spaced from the baking stone and the bottom surface, and above the at least one air intake; a front opening through the outer wall and the inner wall providing access to the cooking chamber; and a rear opening through the outer wall and the inner wall and providing access to the combustion chamber.

Implementations may include one or more of the following features. In some embodiments, the outer wall, inner wall, top portion, bottom portion, at least one air intake, domed ceiling, baking stone, cooking chamber, baffle, front opening, and rear opening are configured such that the at least one formed handgrip does not exceed 150° F. while a temperature in the cooking chamber is 450° F. or less. In some embodiments, the at least one air intake is disposed so that at least some air flow from the at least one air intake flows between the baffle and the bottom surface. In some embodiments, the outer wall, inner wall, top portion, bottom portion, at least one air intake, domed ceiling, baking stone, cooking chamber, baffle, front opening, and rear opening are configured such that at least some heated air within the cooking chamber forms a convective air dam proximate to the front opening. In some embodiments, the outer wall, inner wall, top portion, bottom portion, at least one air intake, domed ceiling, baking stone, cooking chamber, baffle, front opening, and rear opening are configured such that at least some heated air within the cooking chamber exits the cooking chamber through the front opening. In some embodiments, the oven further includes a heat-resistant ceramic insulation material positioned adjacent to at least one of the outer wall, inner wall, top portion, bottom portion, at least one air intake, domed ceiling, baffle, front opening, or rear opening. In some embodiments, a total mass of the oven is between about 10 lbs and about 100 lbs.

One general aspect includes a portable oven, including an oven body having a front opening and a rear opening. The portable oven includes a front air inlet disposed below the front opening and providing air to a lower insulating air space. The portable oven also includes a combustion chamber adjacent to and accessible from the rear opening, the lower insulating space being in communication with the combustion chamber. The portable oven also includes a cooking chamber separated from and disposed above the lower insulating chamber, the cooking chamber being in communication with the combustion chamber, the cooking chamber being accessible through the front opening. The portable oven also includes an intermediate insulating air space between the cooking chamber and the lower insulating air space.

Implementations may include one or more of the following features. In some embodiments, the oven includes an upper insulating air space disposed above and isolated from the cooking chamber. In some embodiments, the oven includes a cooking stone disposed between and separating the cooking chamber and the intermediate insulating air space. In some embodiments, the oven includes a baffle between the intermediate insulating air space and the lower insulating air space.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the modular oven, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

Figure 1:
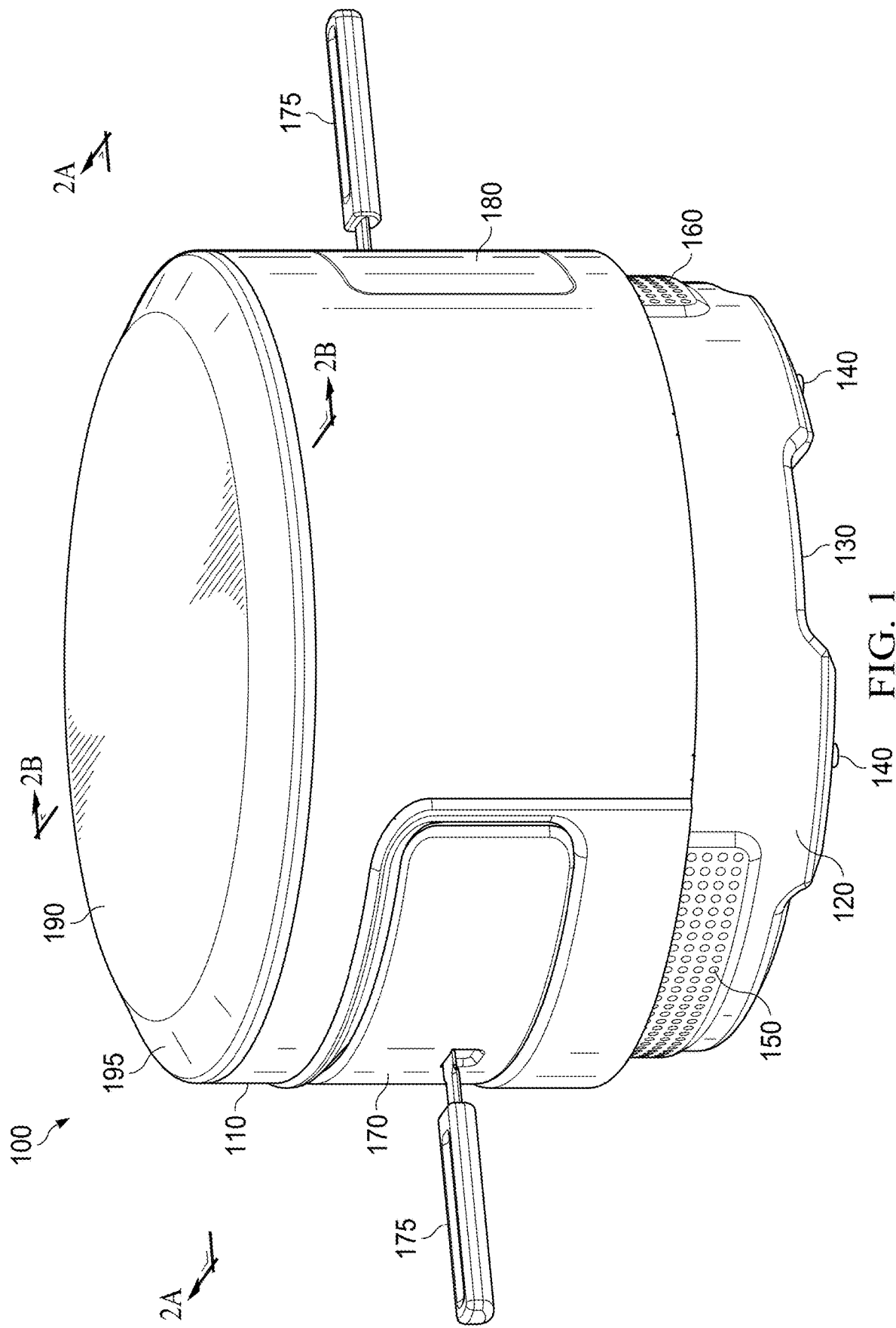
FIG. 1 is a perspective view of an example modular oven, in accordance with at least one embodiment of the present disclosure.

Embodiments of the present disclosure and their advantages are described in the detailed description that follows. It should be appreciated that like reference numerals are used to identify like elements illustrated in one or more of the figures for purposes of illustrating but not limiting embodiments of the present disclosure.

DETAILED DESCRIPTION

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately. These descriptions are provided for exemplary purposes only and should not be considered to limit the scope of the modular oven. Certain features may be added, removed, or modified without departing from the spirit of the claimed subject matter.

In accordance with at least some embodiments of the present disclosure, a modular oven may include various combinations of features, such as stainless steel construction, a circulation-enhancing front lip, a dome-shaped cooking chamber, fully removable front and rear doors with double-walled-insulated design, the ability to burn multiple different types of fuels, front and rear air intakes, integral handgrips, rubberized feet (e.g., rubberized with heat-resistant silicone), and a flat, rubberized (e.g., heat-resistant silicone) top surface.

The modular oven may be configured to enhance convective circulation in the interior. This involves an interior domed ceiling and an advantageous front door to interior height proportions (e.g., a Fibonacci relationship). This differs from current tunnel shaped ovens and may provide substantially more temperature stability and fuel efficiency. This in turn may allow the modular oven to cook more evenly and for longer periods of time (opening abilities to cook many different foods). In some embodiments, the front opening is sized between 12 and 18 inches, to accommodate, for example, 12-13 inch pizzas. Other sizes larger and smaller are contemplated. A double-walled oven body may be insulated with ceramic type high-heat insulation (e.g., flexible ceramic blankets) to help with heat retention and to keep exterior surfaces cool.

In contrast to conventional oven designs that draw air in through the doorway, the modular oven described herein makes use of front and/or rear air intakes in an oven base to bring air into the housing from below, and then circulate up through the combustion chamber. In some implementations, the oven also brings fresh air into the combustion chamber at different heights, which permits integration secondary combustion features in the solid-fuel-burning components.

In some examples, including the example described herein, the base includes handholds in the side for lifting and rubber feet for protection of surfaces. The front bezel around the front opening may be designed to accept a separable, freestanding front door. When used, the door may sit in the opening under its own weight and is an insulated double wall design. Some embodiments employ a series of internal heat baffles underneath the stone and ash pan help reflect radiant heat back up into the cooking chamber, improving efficiency and keeping portions of the base (e.g., where the handholds are located) below 150° F. (65.6° C.)—a touch point heat threshold for human contact.

Some embodiments include a rear door that may nest into position under its own weight, while an angled jamb prevents the door from being able to tip or fall out once in place. To remove the rear door, it may be pulled upwards at an angle. This may help the door stay in position without the need for clasps or separate retaining pieces.

Some embodiments employ removeable handles on the doors. Removable handles may allow for quick engagement but a smaller storage profile. An internal baking stone may cover the entire width of the interior of the oven. This may provide a larger thermal mass to help offset temperature drops from door openings and closings, when doors are so used. This may also provide a wide space for placement of foods. In some embodiments, the stone is split into a plurality of pieces, shown as two pieces herein, to allow removal if necessary (e.g., for cleaning). Some implementations include a shield between the rear of the baking stone and combustion chamber. Among other purposes, this may prevent pizza from being pushed too far into the oven and may also help facilitate advantageous circulation of hot air.

In the example implementations shown herein, the ash pan and fuel basket are removable. Spacing and air inlet holes are strategically located to allow efficient burning and, in some implementations, allow secondary combustion. A gas burner can install in the same rear door location by removing the rear door. For safety, the gas burner must be screwed into the body of the oven using thumbscrews on the burner housing. A cylindrical shape for the modular oven facilitates handling and storage. The modular oven disclosed herein has particular, but not exclusive, utility for outdoor cooking. For example, cooking may be done in yards, parks, campsites, or other areas.

The example implementations described in the present disclosure may aid outdoor cooking operations by improving the usability of combustion-type ovens, such as, for example, wood-fueled ovens, as well as gas-fueled ovens. Some embodiments may include pellet-fueled, charcoal-fueled, or liquid-fueled ovens. Some embodiments may be implemented in durable materials such as stainless steel, with a body design that maximizes air flow for even combustion and that may cool some outer surfaces, the modular ovens disclosed herein may provide practical devices, methods, and systems for cooking food using radiant and/or convective heat. The examples herein may transform a typically non-portable device into one that is portable and may be easily transported by a single person.

FIG. 1 is a perspective view of an example portable, modular oven 100, in accordance with at least one embodiment of the present disclosure. The modular oven 100 includes an oven body 110 which includes a base 120, with handgrips 130 for lifting and rubberized feet 140 for protection of surfaces on which the oven 110 is placed. The base 120 also includes a front vent or front air inlet 150, and a rear vent or rear air inlet 160. The oven body 110 includes a removable front door 170 and a removable rear door 180, each with a removable handle 175. The oven body also includes a top bezel 195 and a flat top 190. In some embodiments, the flat top 190 may include a rubberized surface (e.g., heat-resistant silicone), and/or may serve as a temporary storage shelf. For example, the removable doors 170, 180, and/or the removable handles 175 may be stored temporarily on the flat top 190 during various stages of a cooking procedure.

In the example shown in FIG. 1, the oven body 110 of modular oven 100 has a generally cylindrical outer surface shape. However, it should be understood that at least some portions of the modular oven 100, including the oven body 110, may be otherwise shaped. For example, the oven body 110 may be shaped as a square, rectangle, triangle, hexagon, octagon, or other shape.

Figure 2A:
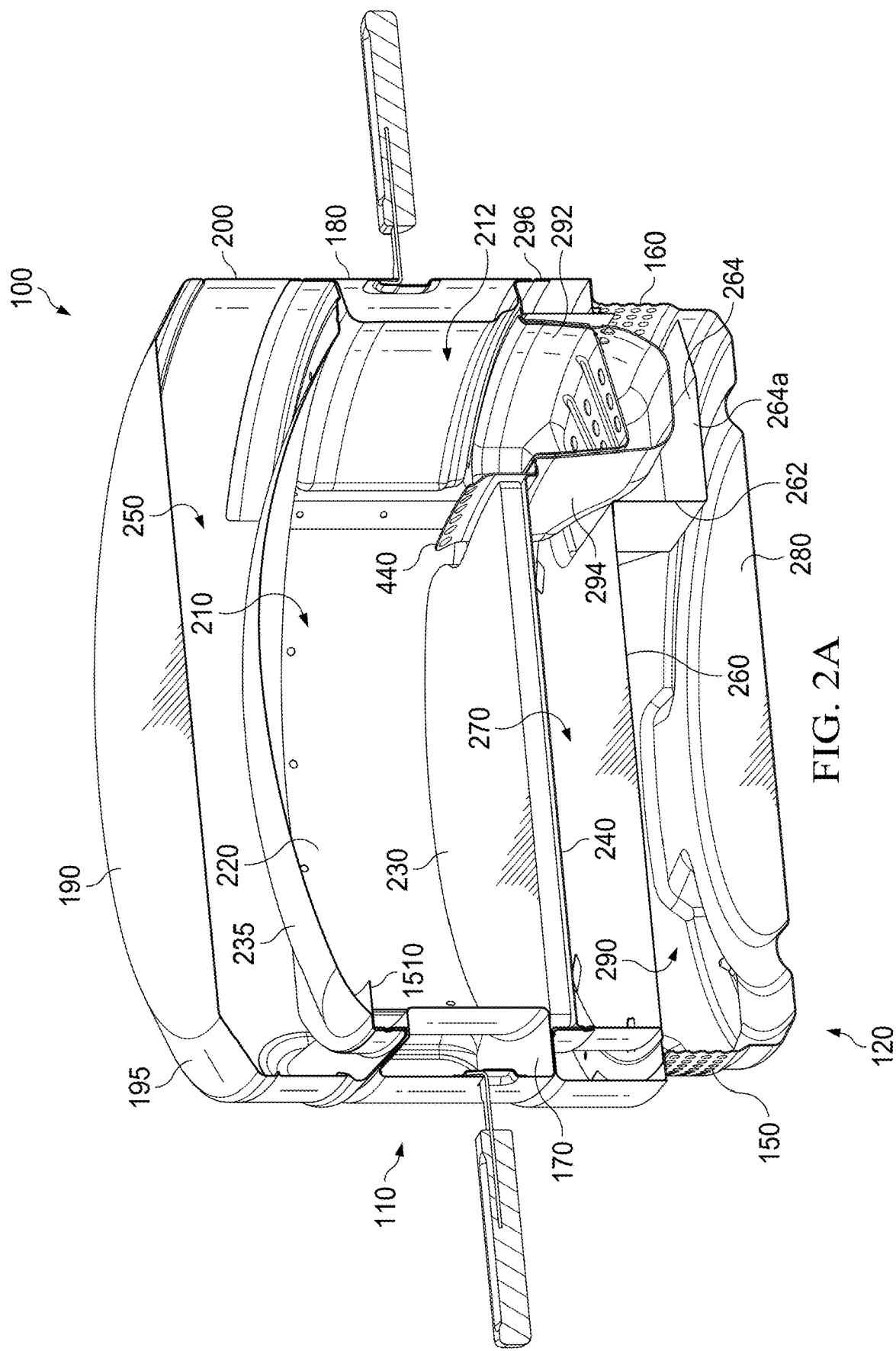
FIGS. 2A and 2B are perspective cross-sectional views of an oven body of an example modular oven, in accordance with at least one embodiment of the present disclosure.
Figure 2B:
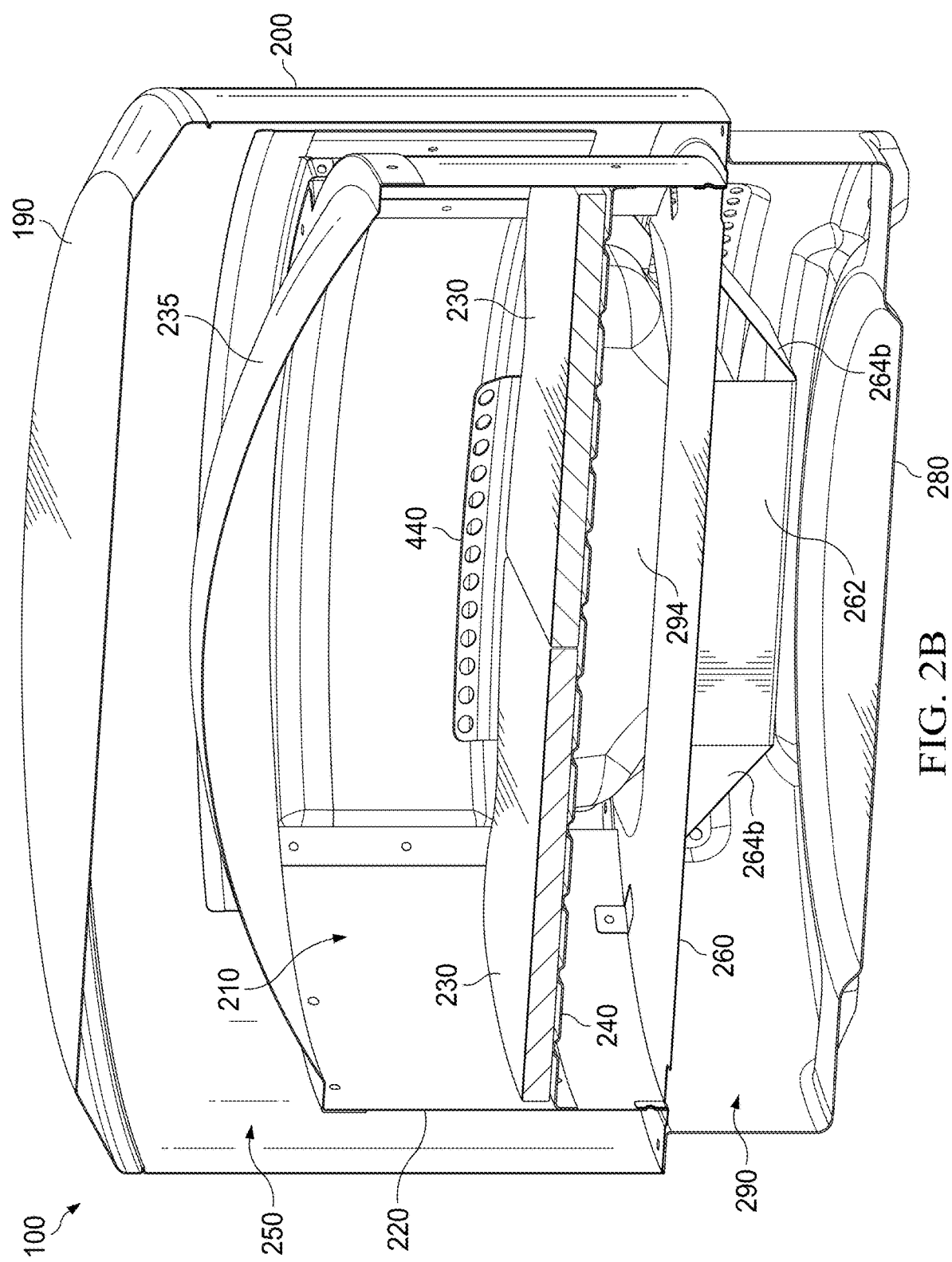

FIGS. 2A and 2B are perspective cross-sectional views of the modular oven 100 taken along lines 2A-2A and 2B-2B respectively in FIG. 1, in accordance with at least one embodiment of the present disclosure. Visible are the oven body 110, front vent or front air inlet 150, a rear vent or rear air inlet 160, removable front door 170 disposed in a front opening 330 (shown without the front door 170 in place in FIG. 3), removable rear door 180 disposed in a rear opening 340 (shown without the rear door 180 in place in FIG. 3), and flat top 190. Also, visible are an outer wall 200, as well as an inner wall 220, baking stone or baking stone 230, and a domed ceiling 235. Due to the cylindrical shape defined by the inner wall 220, some embodiments of the domed ceiling 235 are partially spherical. The domed ceiling may be formed of a single sheet of stamped metal.

The inner wall 220, the baking stone 230, and the domed ceiling 235 define a cooking chamber 210. The inner wall 220 and the outer wall 200 are spaced apart, forming an insulative gap therebetween. In some embodiments when used for fuel burning with wood, pellets, charcoal or other non-gas fuel, the front door 170 and rear door 180 are free-standing, resting in the oven body 110 under their own weight, and are not mechanically connected (e.g., not connected by being hinged, latched, fastened, or otherwise fixed to the oven body 110), but rather entirely removable from the oven body 110 and rely upon the structural shape of the oven body 110, the doors 170, 180, and gravity. When used with a gas burner, the rear door 180 may be attached using fasteners, such as thumb screws for example. Each door 170, 180 may be a double-wall design, including an outer wall, an inner wall, and an insulative gap therebetween. In the implementation shown, the insulative gap is an airgap, although other materials with low thermal conductivity could be included in the gaps between the outer and inner walls. In some embodiments, the domed ceiling 235, inner wall 220, or outer wall 200 may have an insulating material disposed thereon, e.g., with a heat-resistant ceramic layer or coating, or other insulating material.

The domed ceiling 235, together with the outer wall 200, top bezel 195, and flat top 190, define an upper insulating air space 250, which helps keep the top surface 190 cooler than the domed ceiling 235 during cooking operations.

A baking stone tray 240 supports the baking stone 230, and in the implementations shown, includes a series of elevated ridges or bumps that contact the baking stone 230 only at intervals. In some implementations, these ridges or bumps support the baking stone in a manner that provides a low contact area with the baking stone 230. These elevated ridges or bumps may accommodate some air between portions of the baking stone 230 and the stone tray 240, to minimize heat transfer from the baking stone.

A heat baffle 260 is disposed below and spaced from the baking stone tray 240. In this embodiment, the heat baffle 260 supports an angled separating wall 262 and a combustion containment floor 264. The combustion containment floor 264 is therefore at a lower elevation than the heat baffle 260. The combustion containment floor 264 may have angled reflector wings configured to reflect heat upwardly. In the example shown, the angled separating wall 262 is a substantially vertical wall, and the combustion containment floor 264 includes a substantially horizontal wall portion 264a and angled reflector portions 264b extending from the substantially horizontal portion. In this implementation, the angled separating wall 262 and the combustion containment floor 264 are formed from the same sheet metal as the heat baffle 260 and hang down therefrom.

The baking stone tray 240, the heat baffle 260, and the inner wall 220 define an intermediate insulating air space 270.

Adjacent a back of the stone tray, a heat shield 440 extends upwardly above the baking stone 230, The heat shield 440 may also serve as a heat reflector that reflects stone heat toward any baking food.

The separating wall 262, the combustion containment floor 264, the heat shield 440, and the rear door 180 form a combustion chamber 212. The combustion chamber 212 provides heat to the cooking chamber 210.

The heat shield 440 may separate the cooking chamber 210 above the stone from the combustion chamber 212 and may direct hot air flow upwardly toward the domed ceiling 235. In addition, it may physically prevent food from being pushed off the back of the baking stone and into the combustion chamber 212.

A bottom pan 280, together with the heat baffle 260 and outer wall 200, define a lower insulating air space 290, which helps keep the bottom pan 280 (including the handgrips 130, as shown for example in FIG. 1) at a lower temperature than the cooking chamber 210. In an example, handgrips 130 may be formed with the lower insulating airspace to be kept below 150° F., which is a touch point safety threshold for up to one-second touch by unprotected human hands, even when the cooking chamber is up to 450° F. After one second of contact at 150° F., damage may occur to unprotected hands. The use of formed handgrips may reduce the profile of the oven body 110 vs. using attached handles and lengthy projecting legs, thus making the oven body 110 easily portable by a person and easy to store. This may enable a user to take it on campouts, picnics, easily transport it to parks, set it up in a backyard, transport it in a car, truck, or other vehicle, or set up or move it to other temporary places of use. To do this, some implementations of the oven have a total size and mass consistent with one-person carry. Accordingly depending on the implementation, the total mass may be between about 10 lbs to 100 lbs in an assembled condition, with some smaller versions weighing about 10 lbs and some larger versions weighing up to 100 lbs, with some examples weighing 25-30 lbs or 60-75 lbs. In other implementations, the total mass may be between about 10 lbs and 40 lbs in a usable condition. In addition, depending on the implementation, the oven 100 may have a total width (which in cylindrical embodiments may be a diameter excluding the handles) in a range of about 16 to 48 inches. In other implementations, the total width may be in a range of about 16 to 36 inches. The height may be in a range of about 12 to 36 inches in some implementations, and in other implementations, may be in a range of about 16 to 30 inches.

Figure 15:
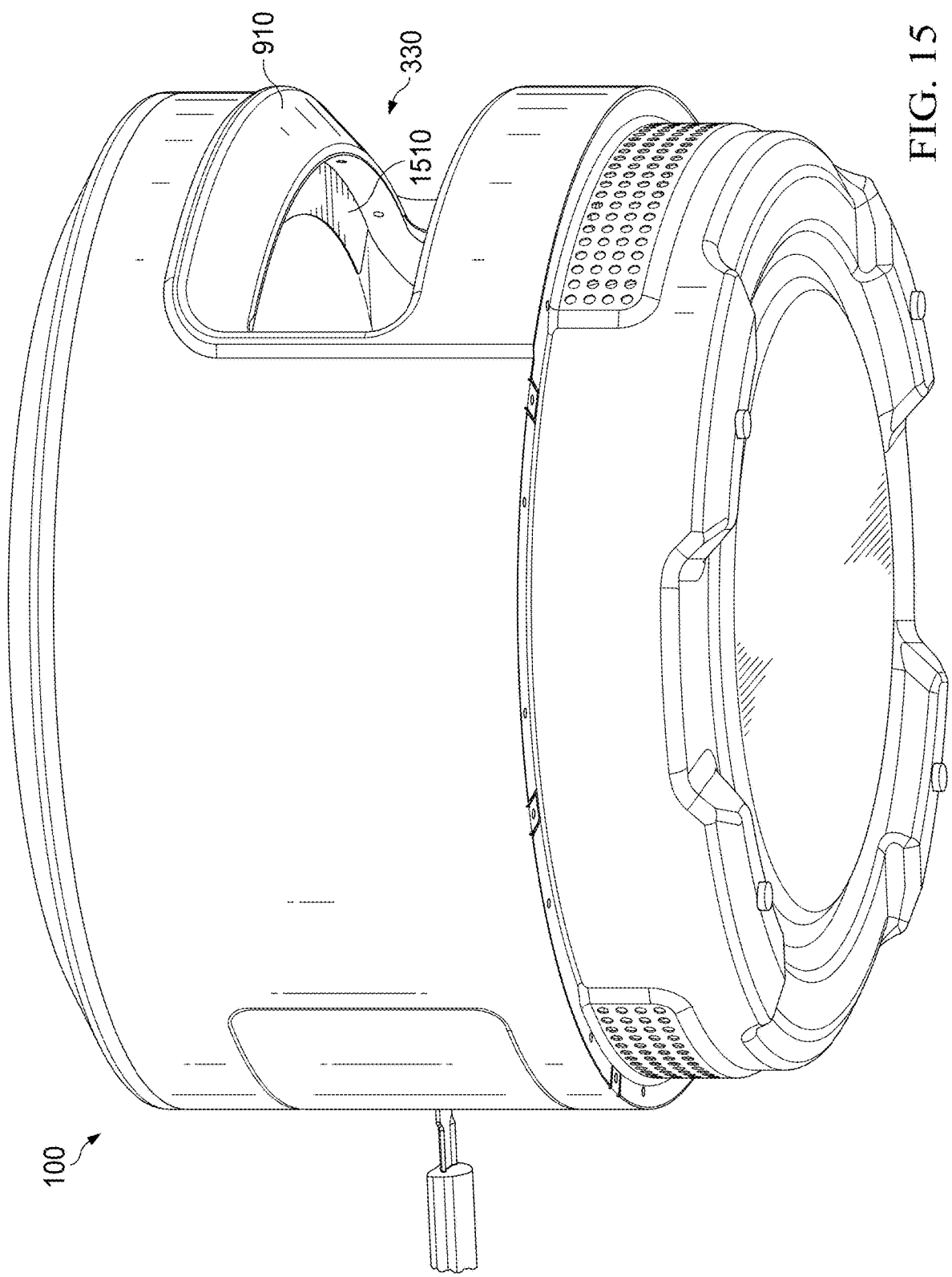
FIG. 15 is a perspective side view of the modular oven, in accordance with at least one embodiment of the present disclosure.
Figure 16:
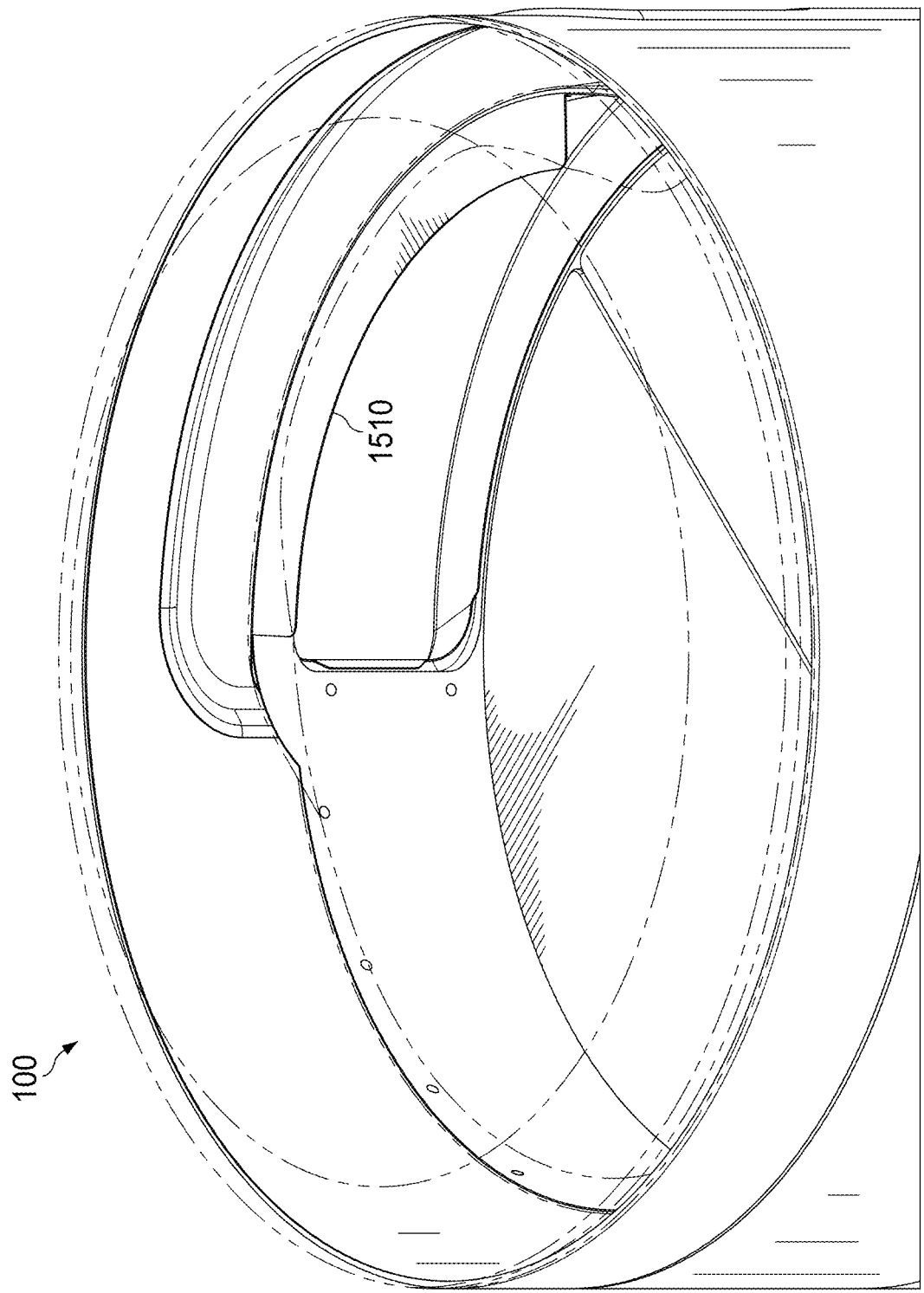
FIG. 16 is a perspective top partially transparent view of the modular oven, in accordance with at least one embodiment of the present disclosure.

Some implementations include an air-flow disrupter 1510 (shown in FIGS. 15 and 16) disposed above the front opening 330. The disrupter 1510 may protrude from the inner wall into the cooking chamber 210 in a substantially flat or horizontal direction between the dome ceiling 235 and the front opening 330. The disrupter 1510 may create turbulent air flow as described herein below. In some implementations, the disrupter 1510 may be disposed only above the front opening, while in other embodiments, it may extend further around the cooking chamber. Also visible are a fuel basket 292 and ash pan 294. In an example, combustible material (e.g., wood) can be placed in the fuel basket 292 and ignited. Ash from the combustion can then fall through the fuel basket and into the ash pan 294. In an example, the outer wall 200, inner wall 220, domed ceiling 235, front door 170, rear door 180, baking stone tray 240, heat baffle 260, bottom pan 280, top bezel 195, flat top 190, fuel basket 292, and ash pan 294 are made of a durable, formable, minimally conducting material such as stainless steel. In other embodiments, the fuel basket 292 and ash pan 294 may be configured to burn charcoal, wood pellets, or other fuels.

The rear door 180 is designed to nest into position under its own weight. In some embodiments, an angled jamb 296 prevents the rear door 180 from being able to tip or fall out once in place. To remove the rear door 180, it can be pulled upwards at an angle. This design enables the door to stay in position without the need for clasps or separate retaining pieces.

Figure 3:
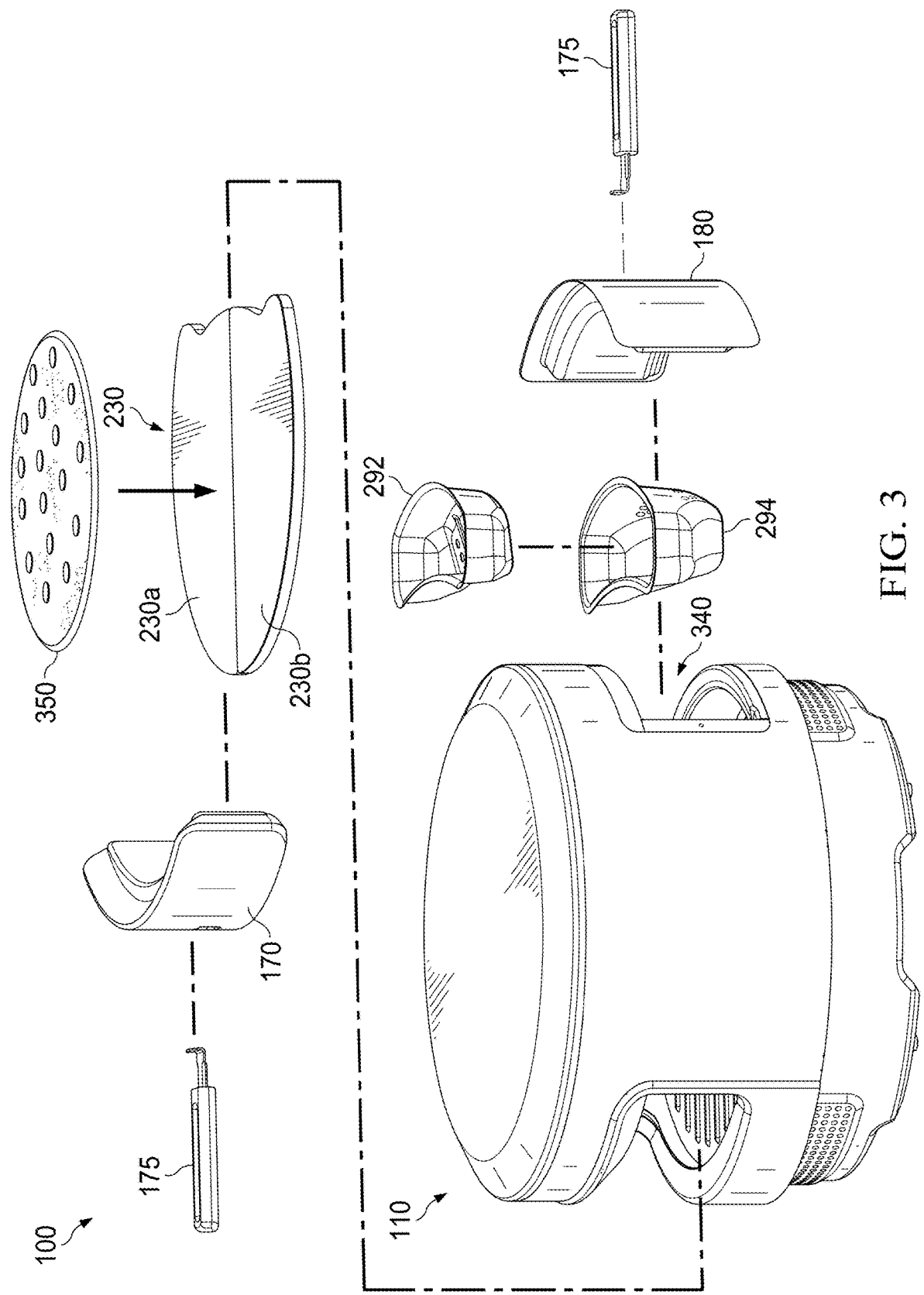
FIG. 3 is an exploded view of an oven body of an example modular oven, in accordance with at least one embodiment of the present disclosure.

FIG. 3 is an exploded view of the modular oven 100, in accordance with at least one embodiment of the present disclosure. Visible is the oven body 110, along with its user-removable components: the front door 170 with removable handle 175, rear door 180 with removable handle 175, baking stone 230, fuel basket 292, and ash pan 294. In an example, the baking stone is divided into two separately handleable pieces 230*a* and 230*b*, each of which is sized to fit through the front opening 330. This enables the baking stone to be large enough to bake pizzas of a desired size (e.g., 12-inch or 13-inch diameter pizzas), while still being removable (e.g., for cleaning). In some embodiments, the baking stone pieces 230*a* and 230*b* are identical, with one being flipped with respect to the other. The fuel basket 292 and ash pan 294 can be moved into place within the oven body 110 through the rear opening 340.

In an example cooking operation, the baking stone 230 is within the oven body 110. The front door 170 and rear door 180 are removed, using the handles 175. The fuel basket 292 and ash pan 294 are then placed into their respective positions within the oven body 110 (as shown for example in FIG. 2), fuel is placed within the fuel basket 292, and ignited. The rear door 180 is then placed back into position within the oven body 110, and a pizza (or other food item(s)) 350 is maneuvered through the front opening 330 and placed onto the baking stone 230 (e.g., with a pizza spatula or other utensil). The front door may remain open until the pizza (or other food item) 350 is fully cooked, at which point the pizza (or other food item) 350 is removed from the oven body 110. The oven body 110 can cool, after which the fuel basket 292 and ash pan 294 are removed, emptied of ash, uncombusted fuel, etc., and then returned to their positions within the oven body 110. The front door 170 and rear door 180 are then closed (e.g., placed back into position within the oven body 110). The oven 100 may then be left in place, moved to storage, etc.

Figure 4:
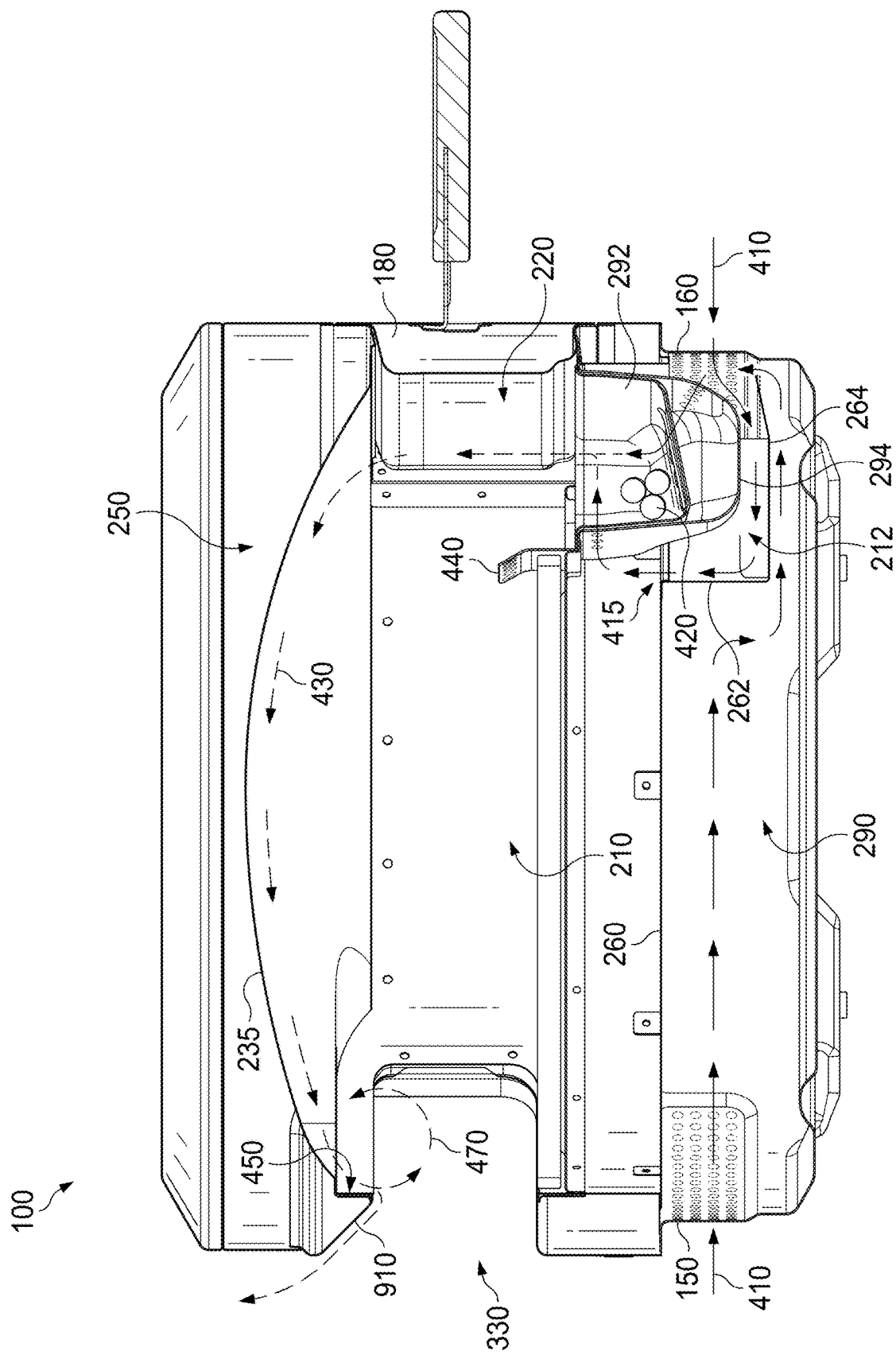
FIG. 4 is a cross-sectional view of the air flow through an example modular oven, in accordance with at least one embodiment of the present disclosure.

FIG. 4 is a cross-sectional view showing the air flow through the example modular oven 100, in accordance with at least one embodiment of the present disclosure. Cool, ambient air 410 is drawn in through the front vent or font air intake 150 and the rear vent or rear air intake 160. The cool air 410 flows through the lower insulating air space 290, helping maintain lower temperatures, which may reduce the likelihood of potential heat damage through the base 120. The cool air 410 then flows upward from the lower insulating air space 290 into the combustion chamber 212. In the combustion chamber 212, the air is drawn through the ash pan 294 and to the fuel basket 292. In some embodiments, cool air 410 also flows up through an opening 415 in the heat baffle 260 and into an upper region of the fuel basket 292. In other embodiments, the only entrance into the fuel basket is through a bottom region of the ash pan and the fuel basket, which are better shown in FIG. 7 below.

Within the fuel basket, fuel 420 (e.g., wood) is combusted, thus heating the cool air 410 and converting it to hot air 430. Hot air 430 rises in the combustion chamber 212 past the heat shield 440. In some embodiments, the heat shield 440 is configured to shape convective circulation of the hot air 430 within the cooking chamber 210. The hot air 430 then rises toward the domed ceiling 235. At the domed ceiling, the air flows from the combustion chamber 212 and into the cooking chamber 210. The heated air follows the shape of the domed ceiling 235 forward to the front opening 330. In some embodiments, at the top of the front opening, the hot air 430 encounters the flow disrupter 1510 at a front lip 450. In the example shown, the front lip 450 includes a vertical wall portion adjacent a horizontal wall portion. The horizontal wall portion connects the vertical wall portion to the dome ceiling. The flow disrupter 1510 and the front lip 450 may be configured to turn a portion of the hot air 430 downward and backward, thus forming a convective air dam 470. Other portions of the hot air 430 exit from the front opening 330 in a generally upward direction (e.g., following the contours of the front opening). Furthermore, the center height of the domed ceiling 235 and the height of the front opening 330 (e.g., the height from the flat surface immediately inside the opening to the domed ceiling immediately inside the opening) have a ratio of between about 1:1.4 and about 1:1.7, thus forming boundaries that accommodate a Fibonacci spiral. Some implementations have a ratio between about 1:1.47 and about 1:1.61. This configuration advantageously encourages convection of the hot air 430 within the cooking chamber 210. This may help the hot air 430 reside for a longer time in the cooking chamber 210, thus shortening cooking times and improving fuel efficiency of the modular oven 100.

Figure 5:
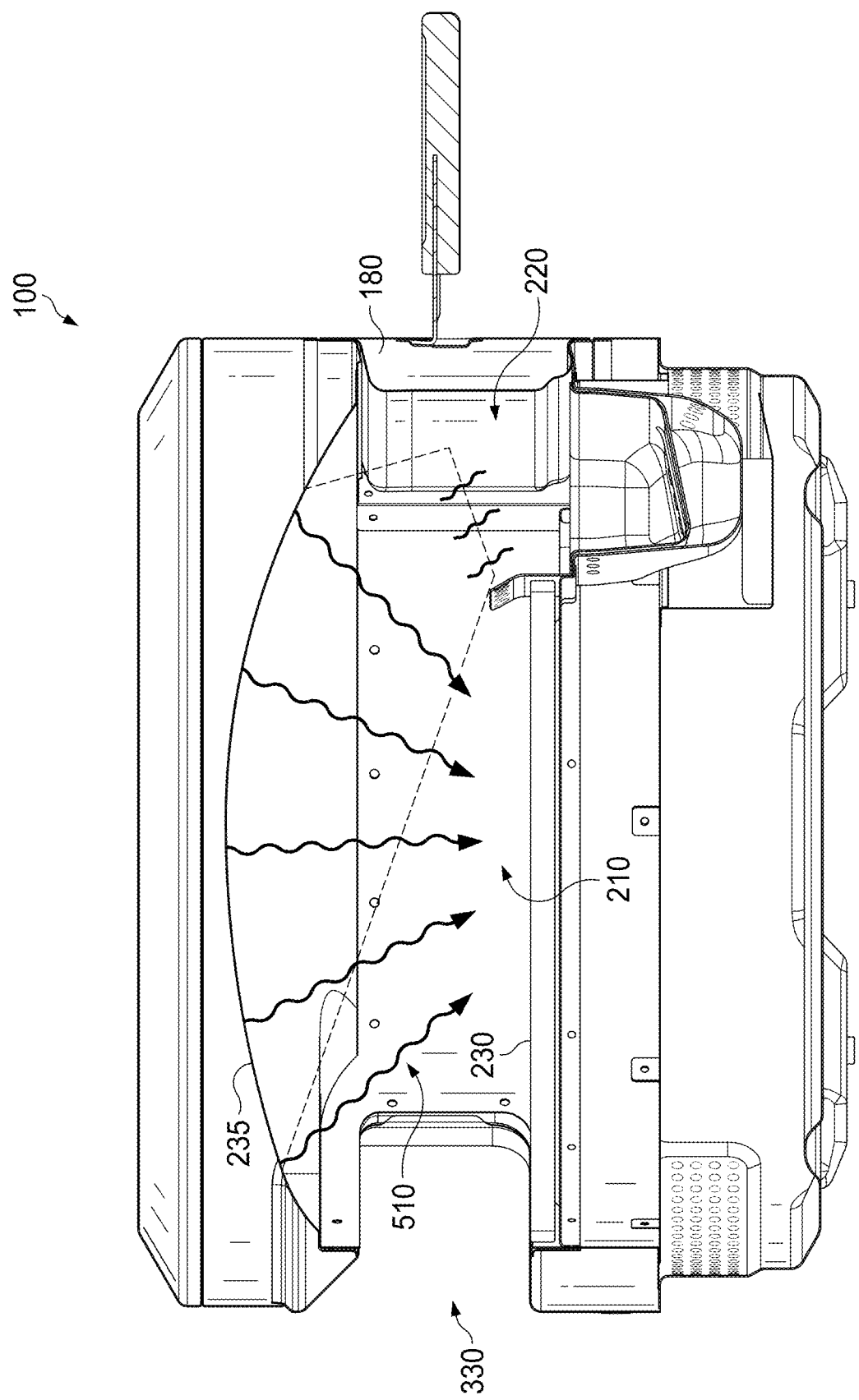
FIG. 5 is a cross-sectional view of radiant heat within of an example modular oven, in accordance with at least one embodiment of the present disclosure.

FIG. 5 is a perspective, cross-sectional view showing radiant heat 510 within of an example modular oven 100, in accordance with at least one embodiment of the present disclosure. When the domed ceiling 235 is heated by the convection of hot air within the cooking chamber 210, the domed ceiling generates radiant heat 510 that is directed generally downward toward the baking stone 230, and any foods (e.g., pizza) that are placed on top of it.

Figure 6:
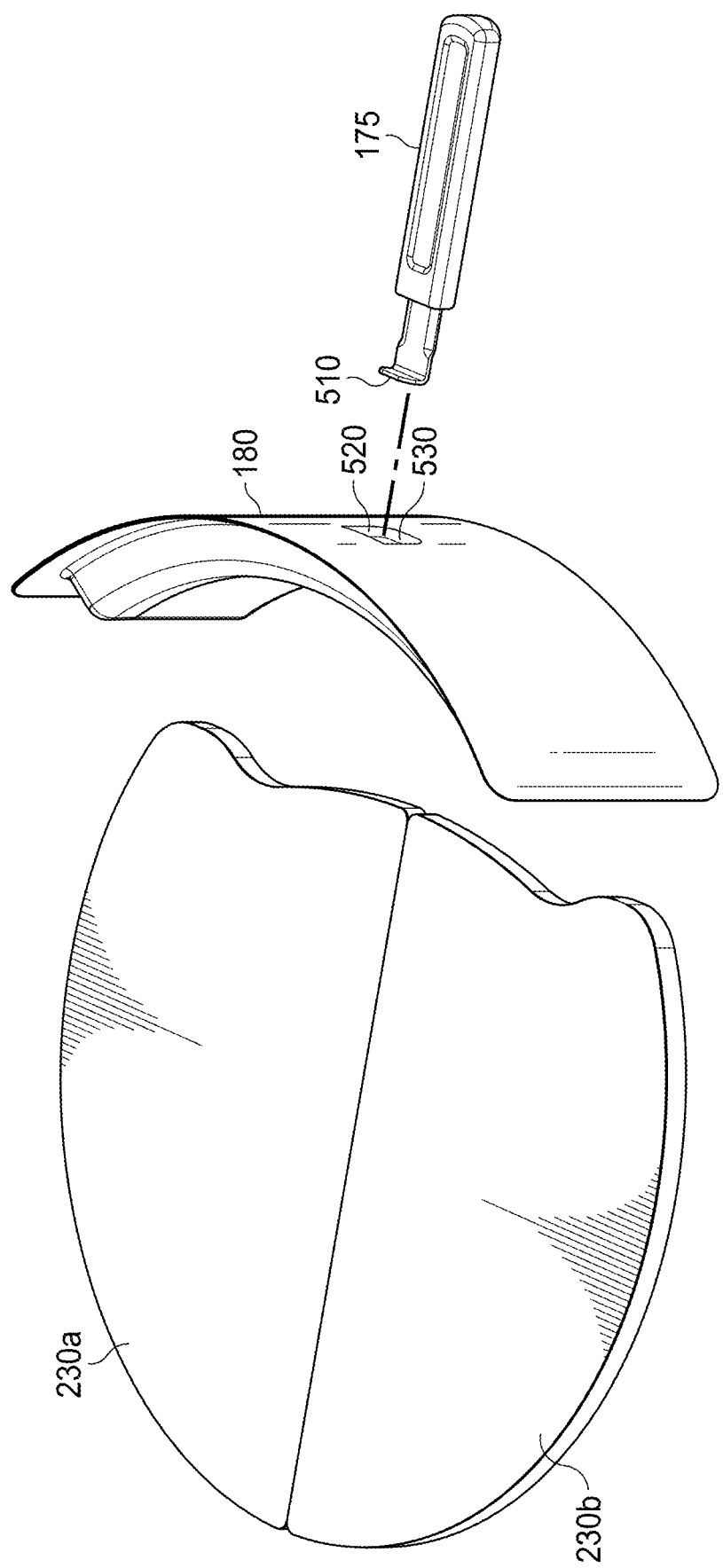
FIG. 6 is a perspective view of at least a portion of an example modular oven in accordance with at least one embodiment of the present disclosure.

FIG. 6 shows the two halves of the baking stone, 230*a* and 230*b*, the rear door 180, and the removable handle 175. In some embodiments, the removable handle 175 includes a hook 510 that fits into a slot 520 within an aperture 530, although other features could be used instead or in addition, to permit the handle to removably engage with the back door 180. In some embodiments, a similar slot 520 and aperture 530 are found in the front door 170 as well.

Figure 7:
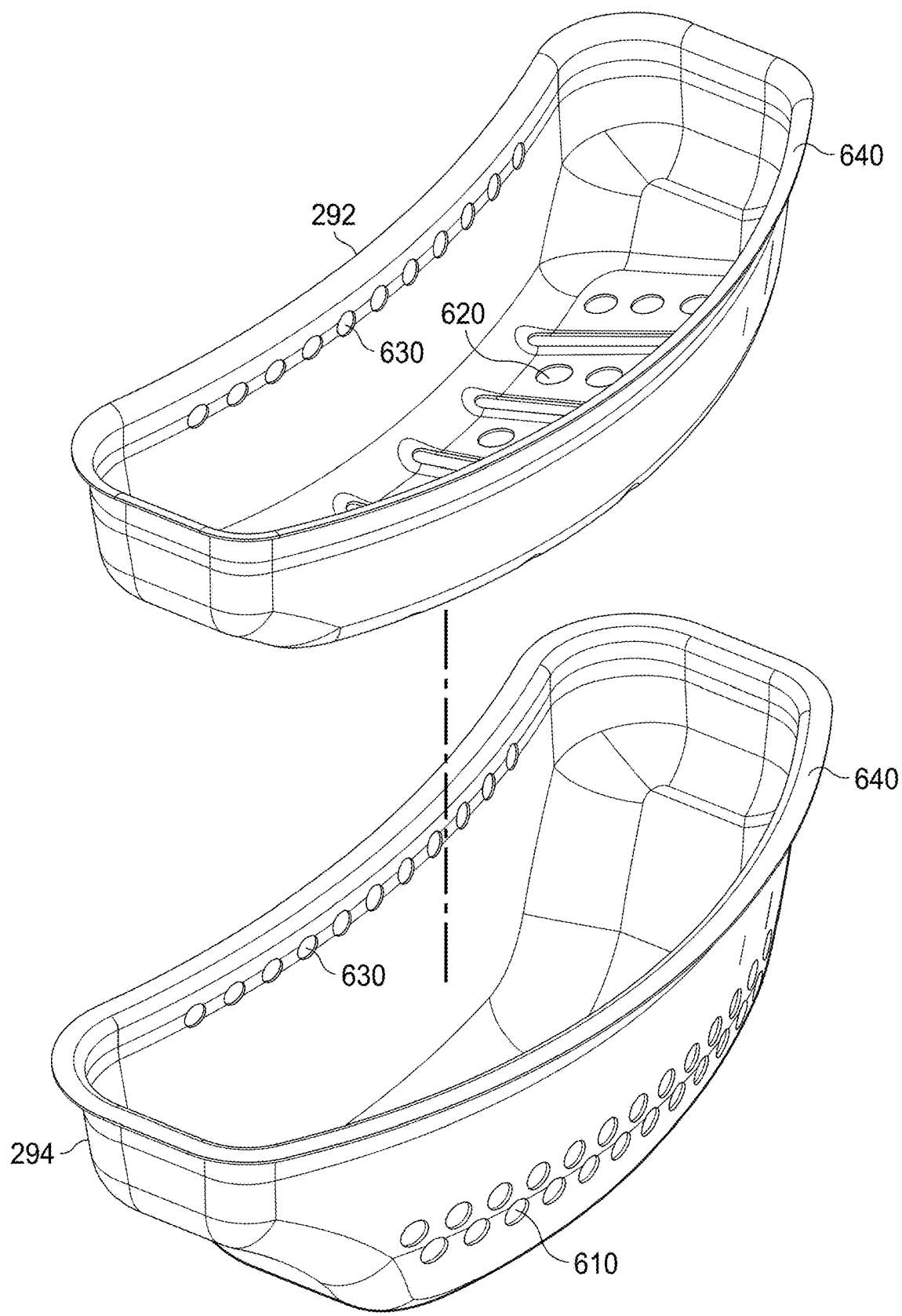
FIG. 7 is a perspective view of fuel basket and ash pan of an example modular oven, in accordance with at least one embodiment of the present disclosure.

FIG. 7 is a perspective view of the fuel basket 292 and the ash pan 294 of an example modular oven 100, in accordance with at least one embodiment of the present disclosure. The fuel basket 292 is configured to nest within the ash pan 294 via a nesting lip or other nesting feature 640, which is configured to fit within a nesting lip or other nesting feature of the oven body 110 in an upward-facing orientation. When fuel is combusted in the fuel basket 292, air is drawn through lower side air holes 610 in the ash pan, and upward through bottom air holes 620 in the fuel basket, to facilitate the combustion. Some implementations of the fuel basket 292 and the ash pan 294 include upper side holes 630. Air may be drawn through upper side holes 630, which may facilitate secondary combustion of hot gases rising from the burning fuel. Secondary combustion can increase the heat output and decrease the smoke production from the combusting fuel. Other implementations of the fuel basket 292 and the ash pan 294 are devoid of upper side holes 630 and include solid walls.

Figure 8:
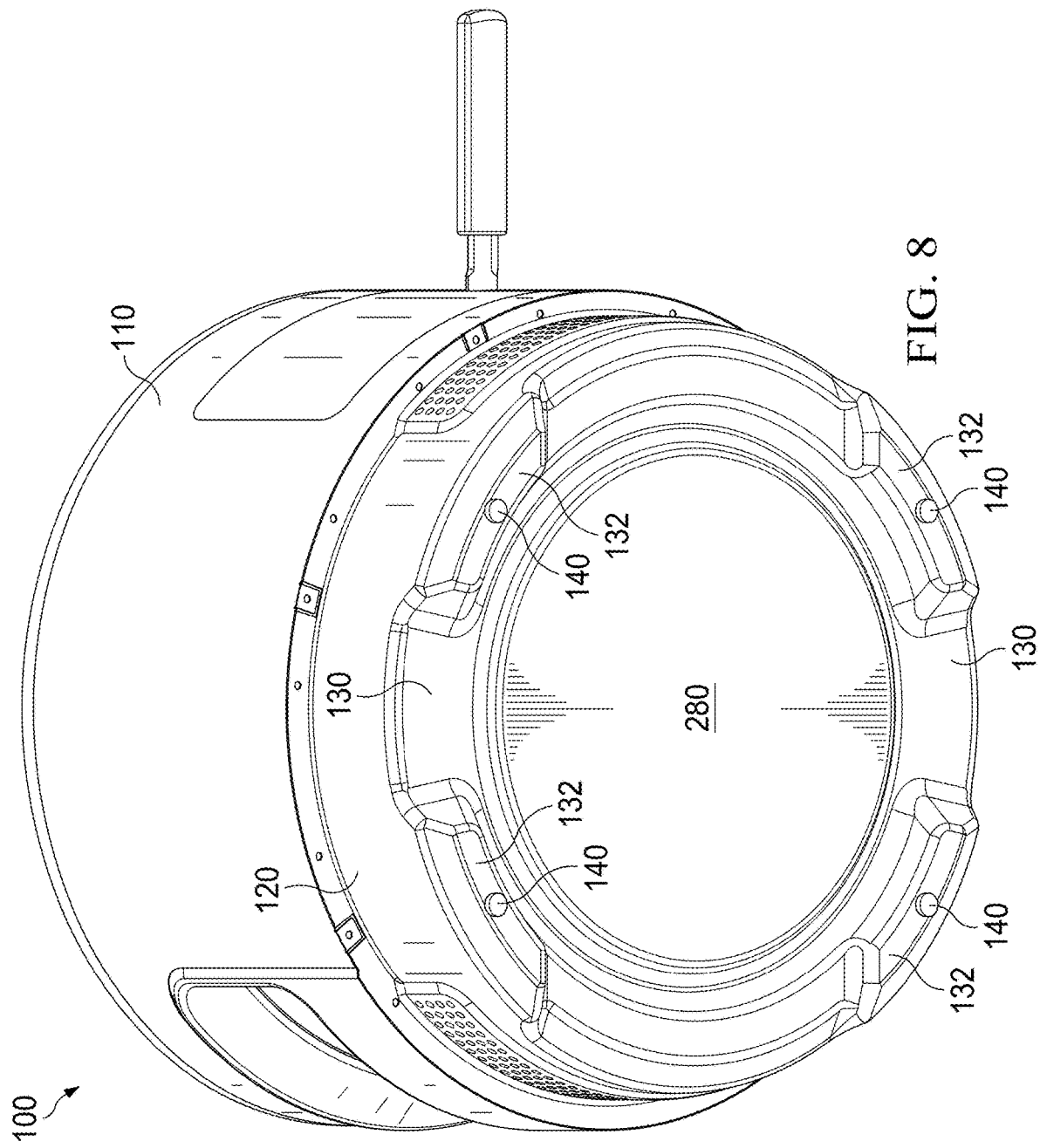
FIG. 8 is a perspective bottom view of the oven body, including the base, in accordance with at least one embodiment of the present disclosure.

FIG. 8 is a perspective bottom view of the oven body 110, including the base 120, in accordance with at least one embodiment of the present disclosure. Visible are the embossed handgrips 130, bottom legs 132, and the rubberized feet 140. The handgrips 130 may permit a user to lift or move the modular oven 100. The rubberized feet 140 may be disposed to support the bottom legs 132 and may be made of an insulating material. The rubberized feet 140 permit cool air to flow underneath the bottom pan 280, including the bottom legs 132 and may prevent the bottom legs 132 from directly contacting the surface on which the modular oven 100 is placed. Such surfaces may for example include picnic tables, tablecloths, dirt, or grass, and the rubberized feet 140 may prevent these surfaces from becoming undesirably hot during cooking operations. In some implementations, the base 120 may be formed of a stamped sheet metal, with both the handgrips 130 and the feet formed therein.

Figure 9:
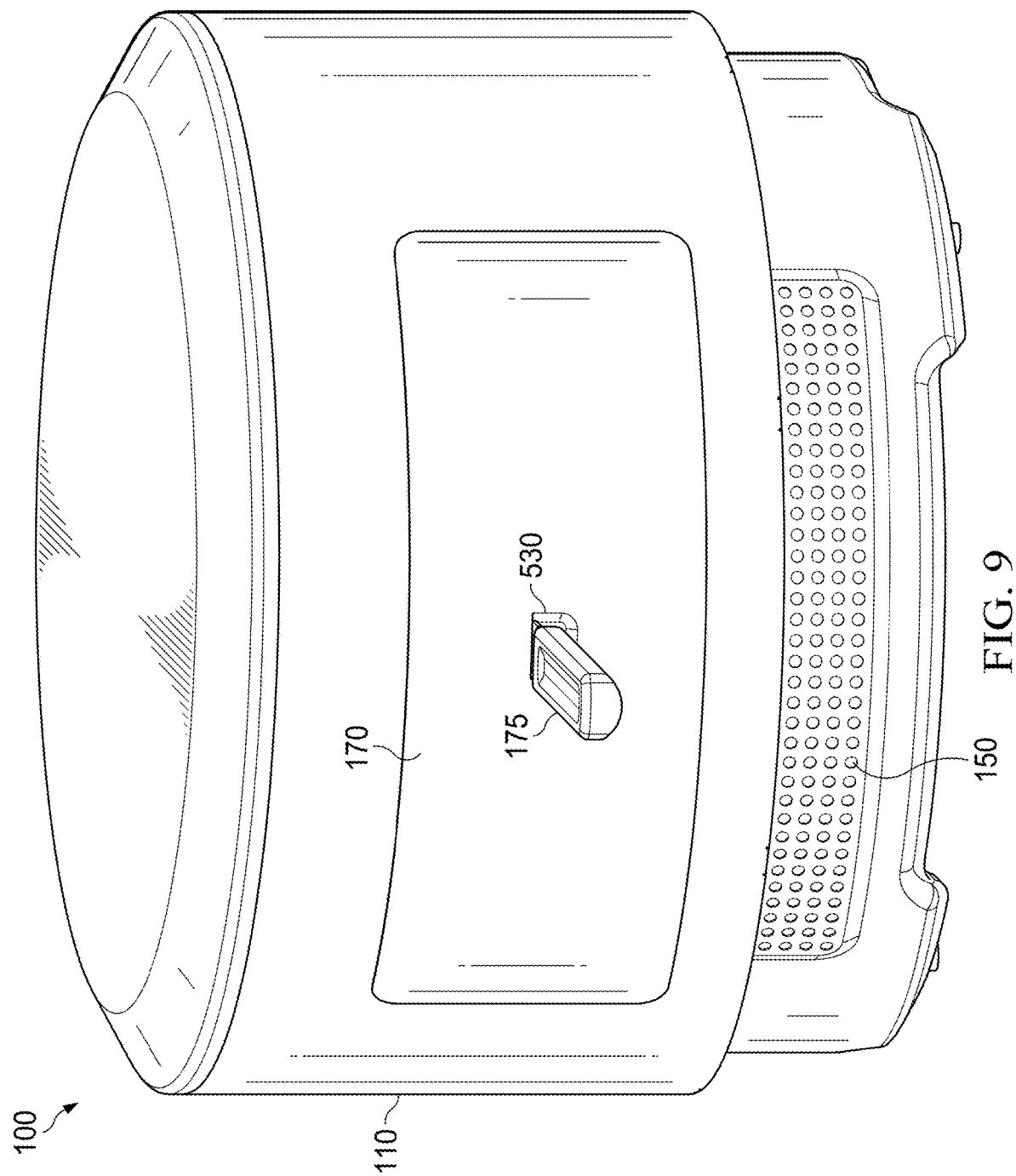
FIG. 9 is a perspective front view of an example modular oven, in accordance with at least one embodiment of the present disclosure.

FIG. 9 is a perspective front view of an example modular oven 100, in accordance with at least one embodiment of the present disclosure. Visible is the oven body 110, front vent or front air intake 150, front door 170, removeable handle 175, and handle aperture 530. A front bezel around the front opening (see FIG. 10) is designed to receive the freestanding front door 170. In some implementations, the front door 170 sits in the opening under its own weight, and may for example be of an insulated, double-walled design.

Figure 10:
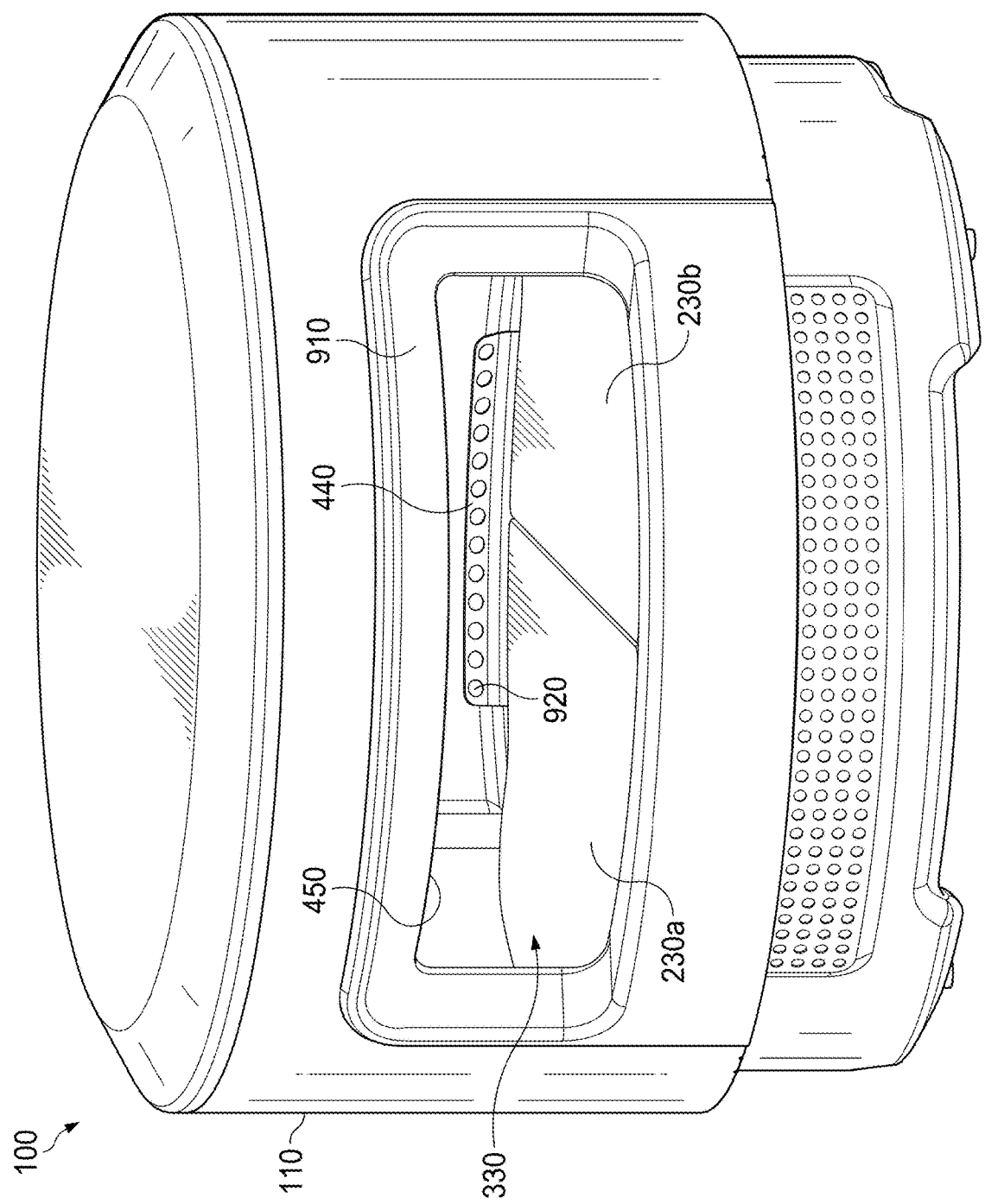
FIG. 10 is a is a perspective front view of an example modular oven, in accordance with at least one embodiment of the present disclosure.

FIG. 10 is a is a perspective front view of an example modular oven 100, in accordance with at least one embodiment of the present disclosure. Visible are the oven body 110, front vent or front air intake 150, front opening 330, baking stone halves 230*a* and 230*b*, heat shield 440, and front lip 450. The front lip 450 is part of a front bezel 910 that is configured to hold the front door 170 in place (see FIG. 9). The heat shield prevents food in the oven from being pushed too far back (e.g., into the combustion chamber or directly over the fuel basket). In some embodiments, the heat shield includes air holes 920 which facilitate fuel combustion and/or convective circulation of hot air within the cooking chamber.

Figure 11:
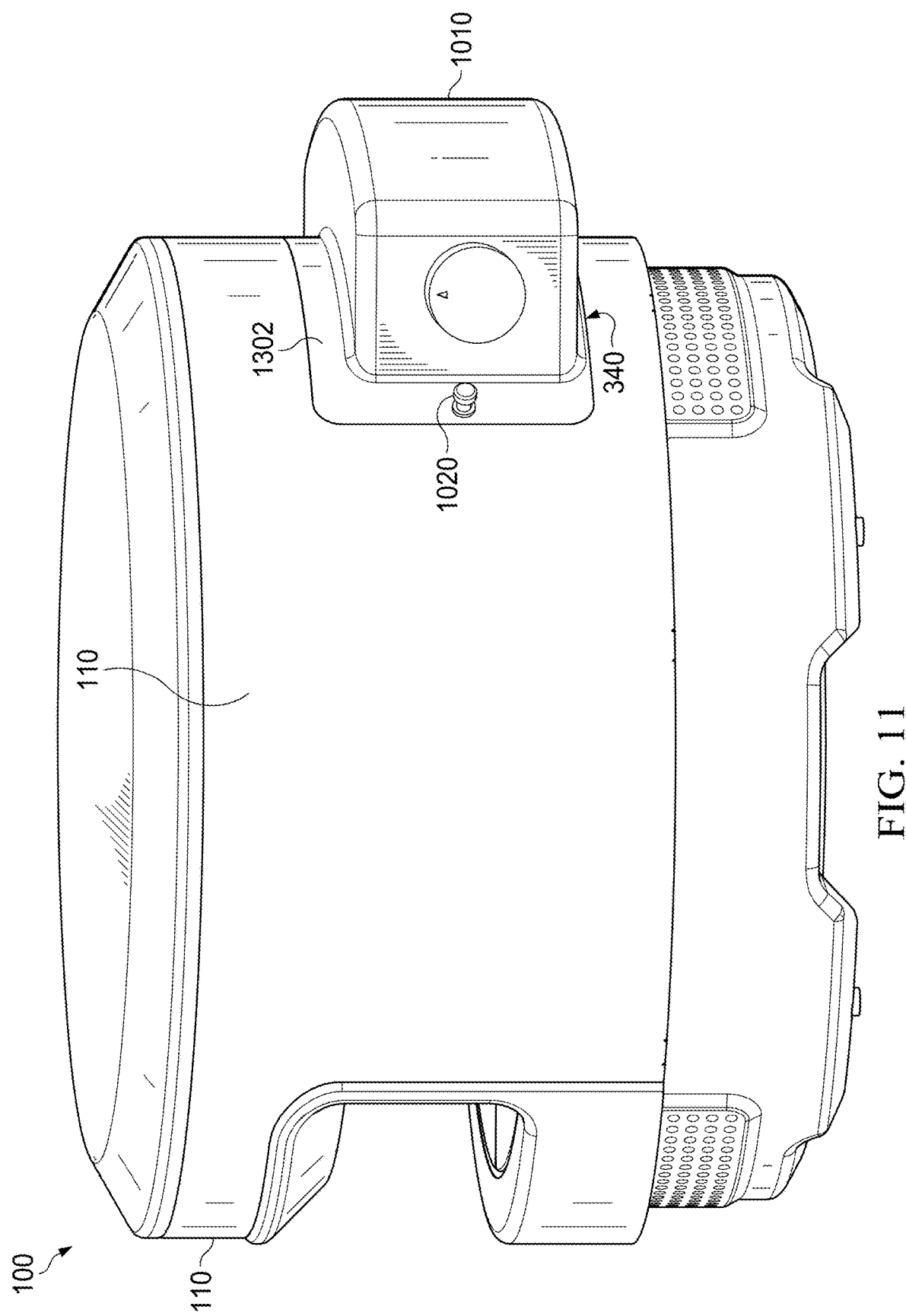
FIG. 11 is a perspective side view of another embodiment of the modular oven, in accordance with at least one embodiment of the present disclosure.

FIG. 11 is a perspective side view of another embodiment of the modular oven, in accordance with at least one embodiment of the present disclosure. In some implementations, the modular oven may be interchangeably heated with fire-burning fuels (e.g., wood, charcoal, pellets, etc.) or heated with gas (e.g., natural gas or propane). FIG. 11 shows an example of the oven 100 in condition to be heated using a gas burner. Accordingly, in this example, the rear door 180 has been replaced with a gas burner 1010 that fits within the rear opening 340 (e.g., within a rear bezel 1030 shown in FIG. 12) of the oven body 110. The gas burner 1010 may be configured to burn liquid fuels such as ethanol or methanol, or gaseous fuels such as propane, butane, or natural gas, although other fuels may be used instead or in addition. In some embodiments, for safety, the gas burner 1010 may be held in place with captive screws 1020 (e.g., thumbscrews).

Figure 12:
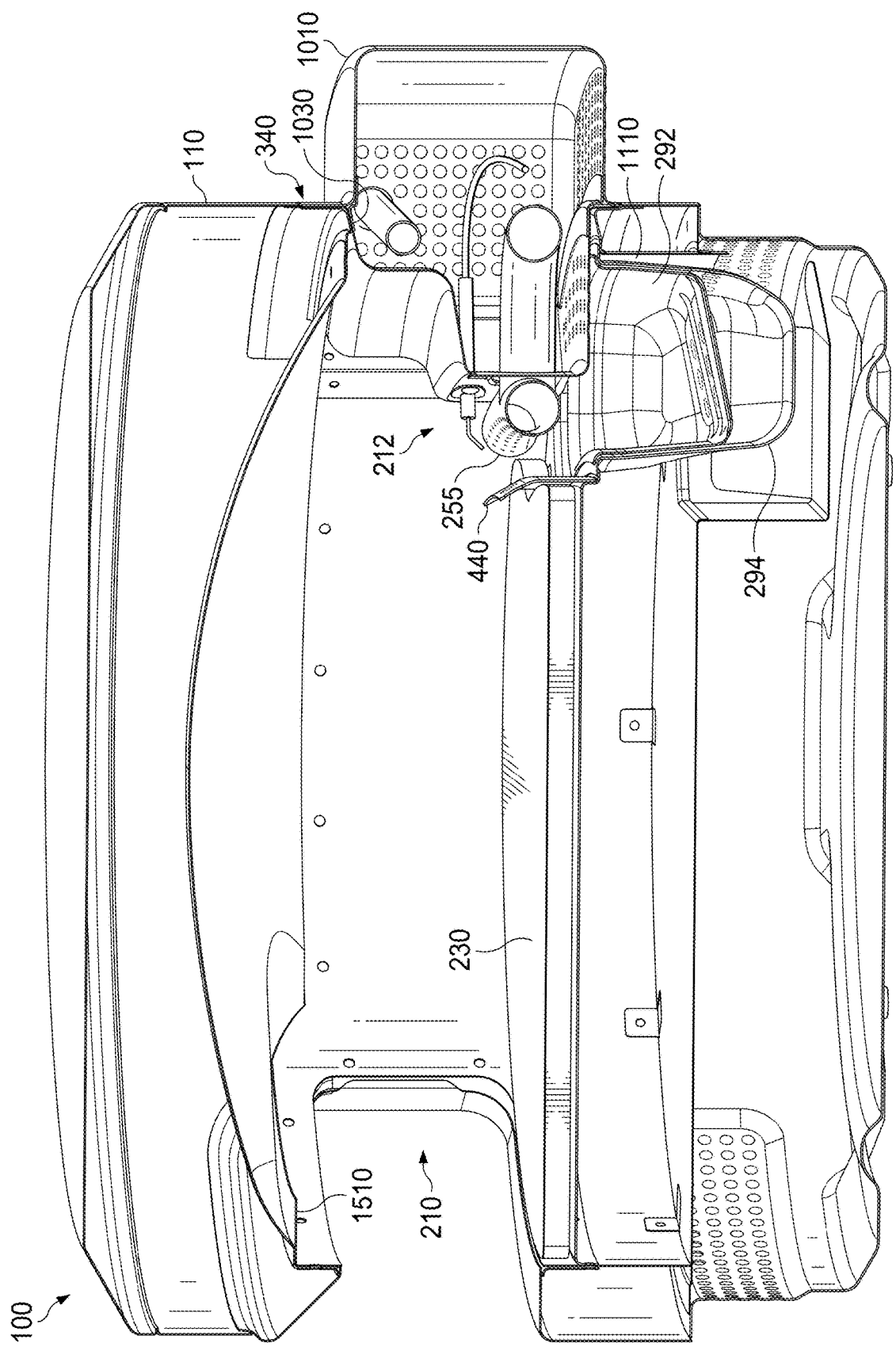
FIG. 12 is a perspective, cross-sectional side view of the example modular oven of FIG. 11, in accordance with at least one embodiment of the present disclosure.

FIG. 12 is a perspective, cross-sectional side view of the example modular oven 100 of FIG. 11, in accordance with at least one embodiment of the present disclosure. In some embodiments, the fuel basket 292 and/or ash pan 294 may be removed to accommodate the gas burner 1010 within the rear opening 340 of the oven body 110. In other embodiments, the gas burner 1010, fuel basket 292, and ash pan 294 are configured such that the gas burner 1010 may be installed in the rear opening 340 while the fuel basket 292 and ash pan 294 are in place within a nesting lip or other nesting feature(s) 1110 of the oven body 110.

Figure 13:
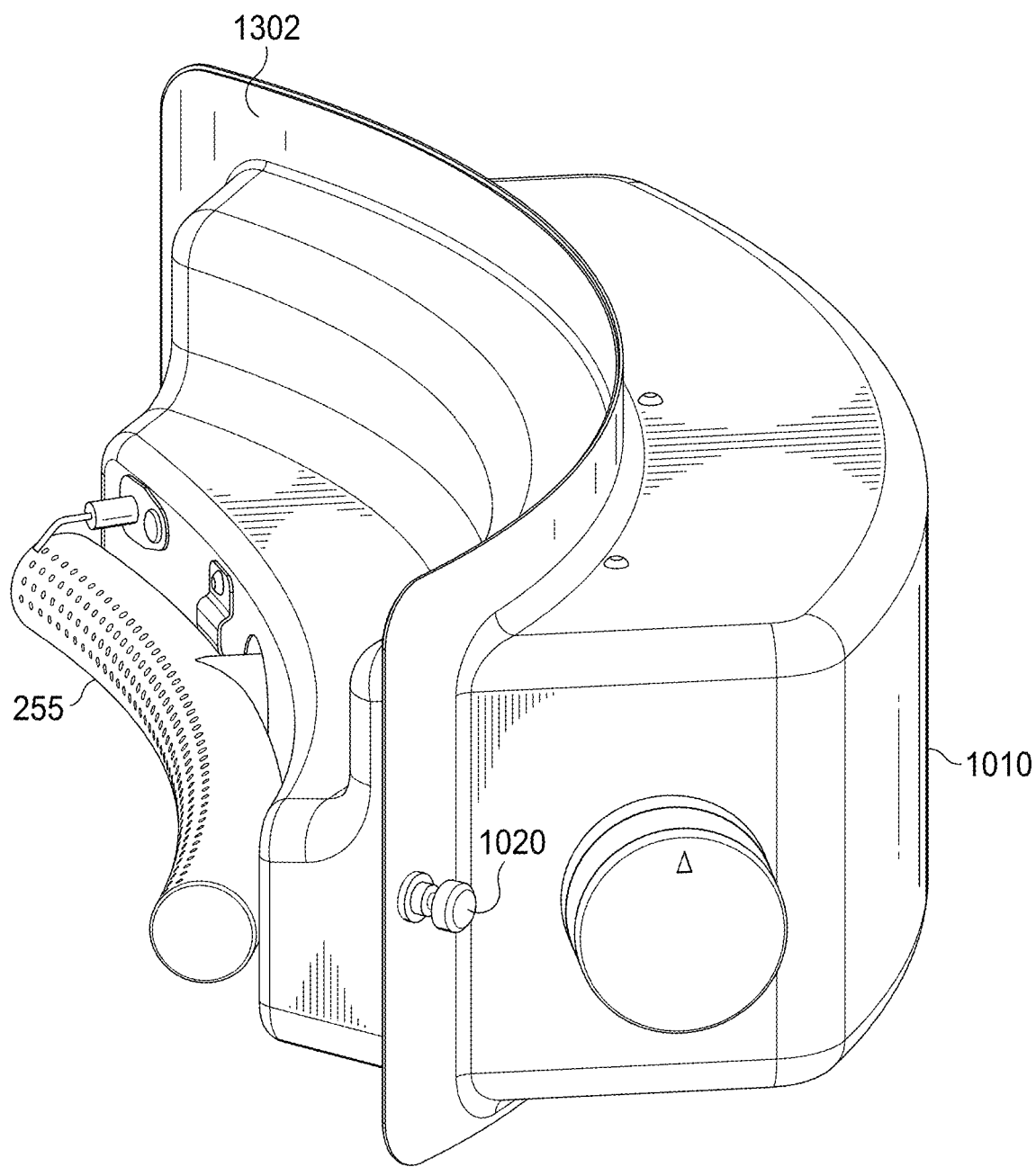
FIG. 13 is a perspective, side view of the bas burner of FIGS. 11 and 12, in accordance with at least one embodiment of the present disclosure.

FIG. 13 is a perspective, side view of the gas burner 1010 of FIGS. 11 and 12, in accordance with at least one embodiment of the present disclosure. Captive screws 1020 may be used to secure the gas burner 1010 within the rear opening of the oven body. The gas burner 1010 may include a plurality of carryover tubes, an igniter, control knobs and other components. A burner 255 may be shaped to emit the gas into the combustion chamber 212. The burner 255 in this embodiment is arc-shaped, curved concentrically with a center of the oven. The heat shield 440 separates the burner 255 from the cooking chamber, directing ignited fuels to burn upwardly forcing hot air toward domed ceiling 235 and into the cooking chamber 210. A flange 1302 extends about a periphery of the gas burner 1010 and is shaped to match and abut against the oven body 110 to help minimize airflow through the rear opening.

Figure 14:
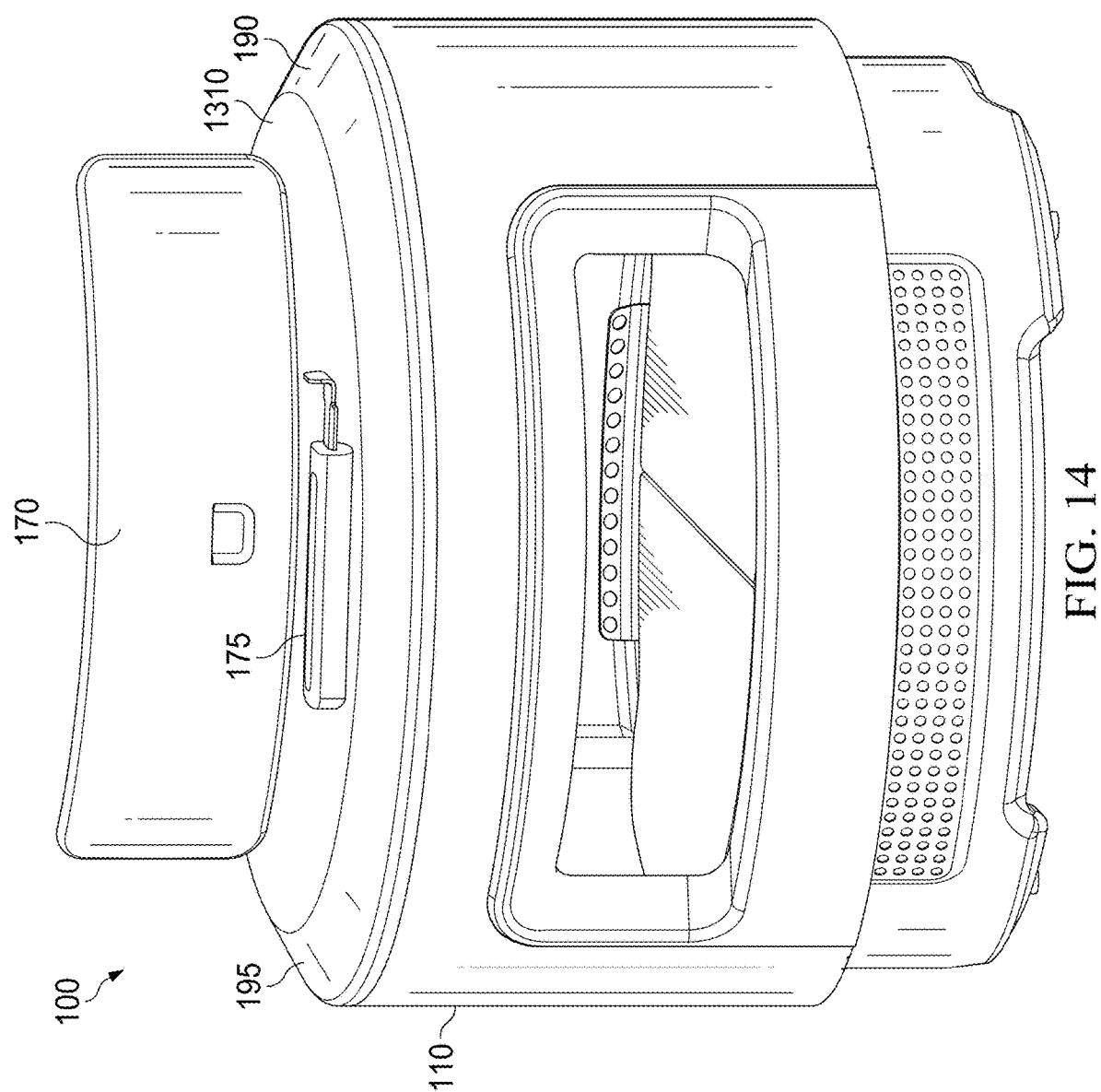
FIG. 14 is a perspective front view of the modular oven, in accordance with at least one embodiment of the present disclosure.

FIG. 14 is a perspective front view of the modular oven 100, in accordance with at least one embodiment of the present disclosure. In the example shown in FIG. 14, the flat top 190 of the oven body 110 includes a flexible mat 1310. The flexible mat 1310 may be fixedly attached (e.g., glued) to the flat top 190, or may be rested on the flat top 190 and held in place by friction. Other attachment types are possible and may be used instead or in addition. The flexible mat 1310 may be made of polymers (e.g., heat-resistant silicone), composites (e.g., fiberglass or rock wool), or other materials capable of withstanding the surface temperatures of the top surface 190 without significant degradation. The flexible mat 1310 may also protect the top surface 190 from scratches and dents when objects such as the front and rear doors are placed on top of it. In some embodiments, the flexible mat 1310 may additionally serve to insulate the flat top 190, both for heat retention within the oven body 110 and to ensure that the flat top 190 remains cool enough to be briefly touched by human hands during cooking operations. The flat top 190, with or without the flexible mat 1310, may be used as a shelf for temporarily storing oven components, foods and condiments, cooking utensils, etc. In the example shown in FIG. 14, the front door 170 and removable handle 175 are temporarily stored on top of the flexible mat 1310.

In some embodiments, the flexible mat 1310 may be replaced with a rigid plate made of an insulating material such as ceramic or plastic.

Attached hereto is an Appendix that includes Figures A through T. Specifically, in several embodiments, one or more of the embodiments of the present application are provided in whole or in part as described and illustrated in the Appendix, which forms part of the present application. Moreover, Figures A through T provide additional support for any U.S. or non-U.S. design applications that are to be filed in the future claiming priority to this present U.S. utility patent application. More particularly, in the Appendix:

Figure A is a top-front-left perspective view of a new, original design for a combustion oven according to a first embodiment;

Figure B is a bottom-front-left perspective view of the first embodiment;

Figure C is a front elevational view of the first embodiment;

Figure D is a rear elevational view of the first embodiment;

Figure E is a left side elevational view of the first embodiment;

Figure F is a right side elevational view of the first embodiment;

Figure G is top plan view of the first embodiment;

Figure H is a bottom plan view of the first embodiment;

Figure I is a top-rear-right perspective view of the first embodiment;

Figure J is a bottom-rear-right perspective view of the first embodiment

Figure K is a top-front-left perspective view of a new, original design for a combustion oven according to a second embodiment;

Figure L is a bottom-front-left view of the second embodiment;

Figure M is a front elevational view of the second embodiment;

Figure N is a rear elevational view of the second embodiment;

Figure O is a left side elevational view of the second embodiment;

Figure P is a right side elevational view of the second embodiment;

Figure Q is top plan view of the second embodiment;

Figure R is a bottom plan view of the second embodiment;

Figure S is a top-rear-right perspective view of the second embodiment; and

Figure T is a bottom-rear-right perspective view of the second embodiment.

In several embodiments, one or more of the embodiments described and illustrated in the Appendix are combined in whole or in part with one or more of the embodiments described above, illustrated in one or more of FIGS. 1 through 16, one or more other embodiments described and illustrated in the Appendix, or any combination thereof.

As will be readily appreciated by those having ordinary skill in the art after becoming familiar with the teachings herein, the present disclosure fills a long-standing need, by improving ease of use for wood-fueled and gas-fueled-fueled ovens, to cook food through radiant and/or convective heat. For example, a user may establish a coal bed of a desired size, with predictable and repeatable thermal properties, without needing to measure fuel quantities. The double-walled design of the oven also permits the outer surfaces of the oven to be substantially cooler than the inner surfaces while the oven is in operation, and the domed ceiling, baking stone tray, and heat baffle define insulating air spaces within the oven body that further isolate the exterior surfaces from the heat inside the cooking chamber, permitting a user (for example) to briefly (e.g., for one second) touch the handgrips even while the oven is cooking, or to place objects on the flat top of the modular oven when they may be too hot to handle or to place on other surfaces. These features allow even inexperienced users to obtain desired cooking results repeatably, with minimal risk of contamination, injury, or fire.

A number of variations are possible on the examples and embodiments described and shown above and in the Appendix. For example, the dimensions or materials of the modular oven may be different than described herein. The shape of the oven body may be different than shown herein, including but not limited to square, rectangular, hexagonal, octagonal, or semicircular. Certain aspects of the technology described herein may be applied to ovens of other kinds, including electric ovens.

Accordingly, the logical operations making up the embodiments of the technology described and shown herein and in the Appendix are referred to variously as operations, steps, objects, elements, components, or modules. Furthermore, it should be understood that these may occur or be performed or arranged in any order, unless explicitly claimed otherwise or a specific order or arrangement is inherently necessitated by the claim language.

All directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the modular oven. Connection references, e.g., attached, coupled, connected, and joined are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples, and data, together with the Appendix, provide a complete description of the structure and use of exemplary embodiments of the modular oven as defined in the claims. Although various embodiments of the claimed subject matter have been described and shown above and in the Appendix with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings and in the Appendix shall be interpreted as illustrative only of particular embodiments and not limiting. Changes in detail or structure may be made without departing from the basic elements of the subject matter as defined in the following claims.

In several embodiments, one or more of the operational steps in each embodiment may be omitted. Moreover, in some instances, some features of the present disclosure may be employed without a corresponding use of the other features. Moreover, one or more of the embodiments disclosed above and in the Appendix, or variations thereof, may be combined in whole or in part with any one or more of the other embodiments disclosed above and in the Appendix, or variations thereof.

Although several embodiments have been described in detail above and in the Appendix, the embodiments described are illustrative only and are not limiting, and those skilled in the art will readily appreciate that many other modifications, changes and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. An oven, comprising:
   a flat, unventilated top surface configured to support items placed thereon during cooking;
   a domed ceiling disposed below the flat, unventilated top surface;
   a baking stone disposed below the domed ceiling;
   a cooking chamber between the domed ceiling and the baking stone, the domed ceiling being shaped and disposed to direct airflow over the baking stone to heat food on the baking stone in the cooking chamber and to generate radiant heat toward the food on the baking stone;
   a first opening that provides access to the cooking chamber, the first opening having no connected door and being sized to accommodate food to be cooked in the oven;
   a combustion chamber disposed adjacent the cooking chamber;
   a front opening bezel positioned within the first opening; and
   a gas burner configured to supply heat to the cooking chamber when a gas of the gas burner is combusted, wherein the baking stone comprises a cutout configured to accommodate the burner.

2. The oven of claim 1, further comprising a front lip positioned at a top edge of the front opening bezel, the front lip configured to affect air flow within the cooking chamber.

3. The oven of claim 2, wherein a height of the front opening has a ratio of between 1:1.4 and 1:1.7 to a height of a highest feature of the domed ceiling above the baking stone.

4. The oven of claim 1, further comprising a heat shield disposed between the baking stone and the combustion chamber and extending to an elevation above the baking stone, the heat shield separating the cooking chamber from the combustion chamber.

5. The oven of claim 1, wherein the baking stone comprises two separate, symmetrical pieces, wherein each piece is sized to pass through the first opening.

6. The oven of claim 1, further comprising a control knob for the gas burner.

7. The oven of claim 1, further comprising an igniter for the gas burner.

8. The oven of claim 1, further comprising a flexible, heat-resistant mat sized and shaped to rest on the flat, unventilated top surface.

9. The oven of claim 1, wherein the flat, unventilated top surface is configured for use as a shelf.

10. The oven of claim 1, wherein the flat, unventilated top surface, the domed ceiling; the cooking chamber; the combustion chamber, and the front opening bezel comprise stainless steel.

11. The oven of claim 1, further comprising a plurality of rubberized feet.

12. The oven of claim 1, further comprising a ventilated base.

13. The oven of claim 1, further comprising an inner wall and an outer wall.

14. The oven of claim 1, further comprising a baking stone tray that supports the baking stone.

15. The oven of claim 14, wherein the baking stone tray comprises elevated ridges or bumps that contact the baking stone only at intervals.

16. The oven of claim 15, wherein the ridges or bumps accommodate an air space between the baking stone tray and portions of the baking stone.

17. The oven of claim 14, further comprising a bottom pan disposed below the baking stone tray, wherein the bottom pan is spaced from a surface on which the oven rests.

18. The oven of claim 1, wherein the gas burner is arc shaped.

* * * * *